United States Patent [19]
Kwon et al.

[11] Patent Number: 5,091,972
[45] Date of Patent: Feb. 25, 1992

[54] SYSTEM AND METHOD FOR REDUCING DIGITAL IMAGE NOISE

[75] Inventors: Heemin Kwon, Pittsford; Martin C. Kaplan, Rochester, both of N.Y.

[73] Assignee: Eastman Kodak Company, Rochester, N.Y.

[21] Appl. No.: 583,637

[22] Filed: Sep. 17, 1990

[51] Int. Cl.$^5$ .......................... G06K 9/40; G06K 9/56; G06K 9/54; H03F 1/26
[52] U.S. Cl. ........................................ 382/54; 382/27; 382/43; 382/49; 364/574; 364/725
[58] Field of Search ....................... 382/27, 54, 42, 43, 382/49; 364/574, 725, 413.2

[56] References Cited
U.S. PATENT DOCUMENTS
4,139,303  2/1979  Carlson et al. ..................... 356/39

Primary Examiner—Michael Razavi
Assistant Examiner—Michael Cammarata
Attorney, Agent, or Firm—Edward Dugas

[57] ABSTRACT

The present invention efficiently and quickly computes the fit parameters for a noise reduction method wherein a digital image is first decomposed into two types of regions; smooth regions and edge regions. Within the digitized image a plane fit parameter is computed at every point. The computation of the fit parameters incorporates convolutions carried out in an efficient manner by the use of a slide sum technique.

20 Claims, 13 Drawing Sheets

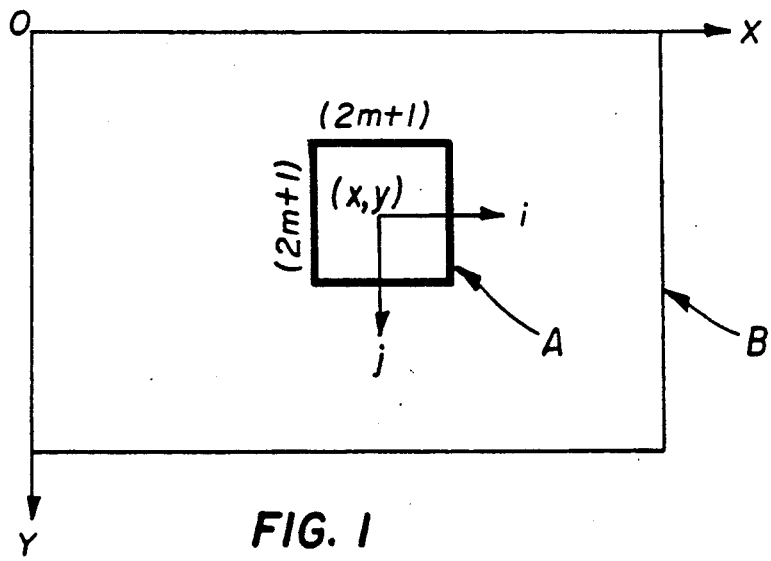
FIG. 1
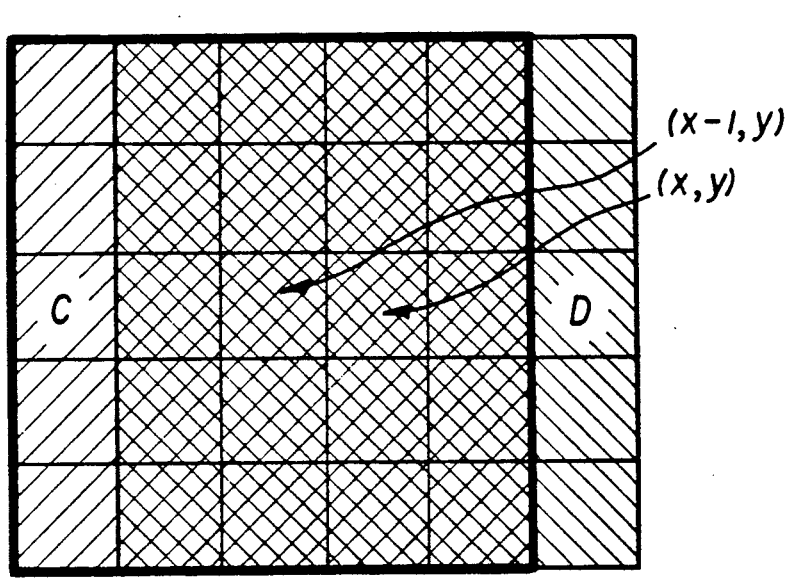
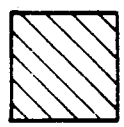 REPRESENTS $A_2(x,y)$
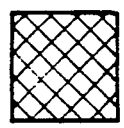 REPRESENTS BOTH $(A_2 x,y)$ AND $A_2(x-l,y)$
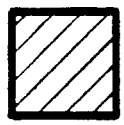 REPRESENTS $A_2(x-l,y)$
COLUMN $C = A_1(x-m-l,y)$
COLUMN $D = A_1(x+m,y)$
 − (COLUMN C) + (COLUMN D).
FIG. 2

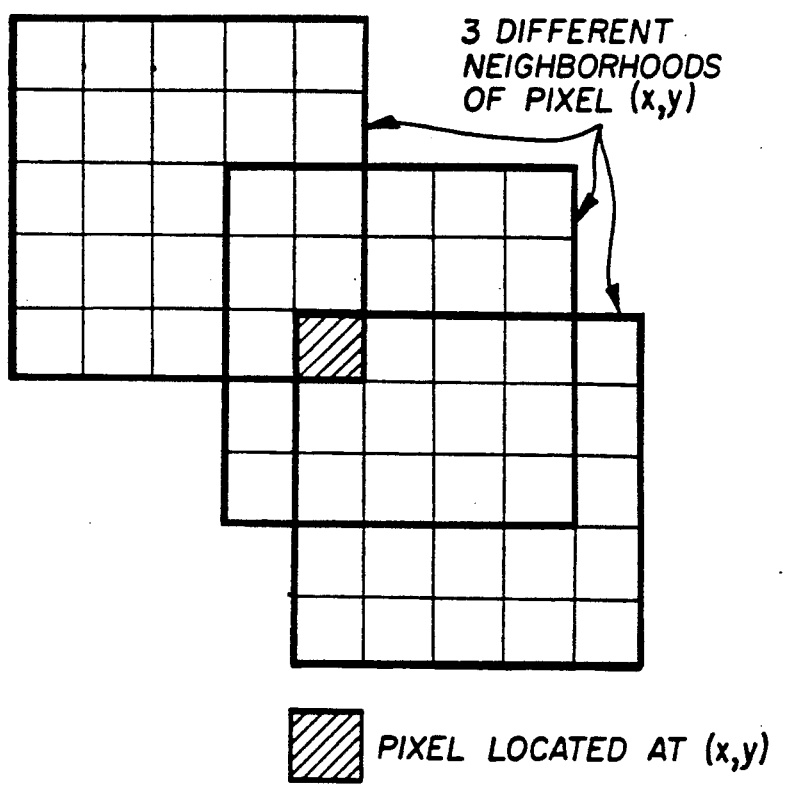
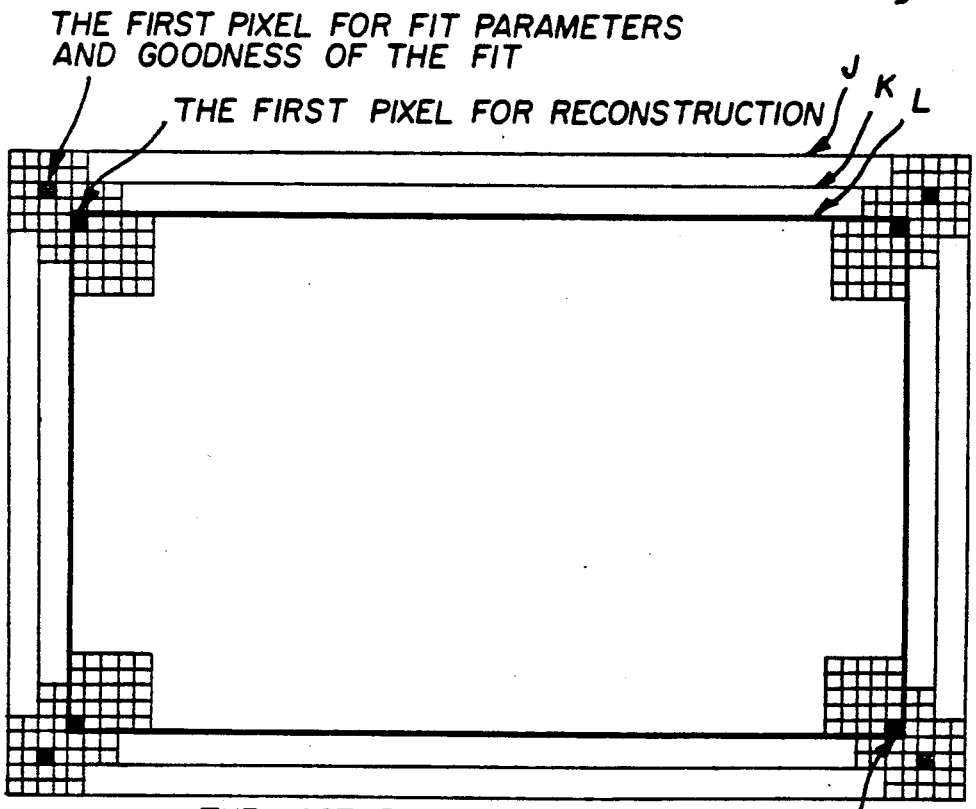

SYSTEM AND METHOD FOR REDUCING DIGITAL IMAGE NOISE

CROSS-REFERENCE TO RELATED APPLICATION

The present application is related to U.S patent application Ser. No. 399,134 filed on Aug. 28, 1989, entitled "Digital Image Noise Reduction of Luminance and Chrominance based on Overlapping Planar Approximation" by M. C. Kaplan et al., bearing the U.S. patent application Ser. No. 07/399,135 filed on Aug. 28, 1989, entitled "A Computer Based Digital Image Noise Reduction Method Based on Overlapping Planar Approximation" by M. C. Kaplan et al.

TECHNICAL FIELD OF THE INVENTION

The present invention is broadly directed to the field of image data processing and, more particularly, to a method for reducing the noise in digital photographic images by incorporating an efficient method of pipelined calculation in determining fit parameters and reconstructing fitted pixel values into a method for smoothing, by a least squares fit technique, the smooth regions of a digital image while maintaining the edge regions undisturbed.

BACKGROUND OF THE INVENTION

To transform a digital image to a finished print of high quality requires that noise components, introduced because of the transformation of the image from the original scene to electrical signals, be reduced and/or eliminated such that the noise does not become discernible to the human eye.

One of the methods receiving widespread use in the prior art is related to smoothing the differences between the values of the gray levels of pixels located in neighborhoods. A difficulty associated with this smoothing process is that it not only removes the noise components, but it also blurs the edge values. The edges exist when there is a transition region such as a region containing sharp detail, for example grass, which may define or outline a neighboring region which may be either smooth or sharply detailed.

A patent of interest for its teaching of noise reduction in a data processed image is U.S. Pat. No. 4,734,770 entitled, "Image Data Processing Method and Device Therefor" by I. Matsuba. The method of that patent treats the first image data set, consisting of a plurality of pixels having values corresponding to their gray level, some of which contain noise components, by transforming them into second image data to reduce the noise components appearing in the second image data. The method operates by selecting pixels to be treated and obtaining proposed values (candidate values) which should be given to the object pixels based on the stated relationship. A probability function is used to determine whether a pixel in question should be raised to the candidate value or be maintained at its present value. The probability formula includes the image energy component as one of its items. A recognition is made for edges of patterns based on the energy level comparisons, wherein a high energy level difference between a central and an adjoining pixel would have a high probability of defining an edge.

In the cross-referenced related applications a solution to the edge blurring, when performing the smoothing operation, approaches the problem by determining edge regions and by leaving those regions undisturbed or unoperated upon and by applying a smoothing function to the smooth regions so as to reduce noise in those areas. The aforementioned solution has two responsibilities, number one to identify whether a pixel belongs to an edge or to a smooth region and, number two, to compute a smoothing code value for the pixel if it belongs to a smooth region. These two operations are called "segmentation" and "smoothing", respectively. Both of the aforementioned tasks are accomplished by a least squares fit of a plane to the image, in a neighborhood around the pixel of interest. If the goodness of the fit is small, then in that neighborhood the image is well approximated by a plane and thus must be a smooth region. Further, the fit provides a smooth estimate for the code value at the pixel of interest, which is the value of the fitted plane at the pixel of interest.

The methods of the cross-related applications perform their functions quite well. One area of improvement in the utilization of these methods is a reduction in the time of computation required for the least squares fitting and estimation of the fitted values. The present invention is directed to an efficient and quick method to compute the fit parameters and the fitted values in a pipeline manner based on the recursive nature of the computation.

SUMMARY OF THE INVENTION

The preferred method of the present invention provides an efficient and quick method of computation of the fit parameters, goodness of the fit, and the estimation of the fitted values in pipeline calculations. According to one method embodiment of the present invention, a digital image is processed in a computer to remove noise by performing the following steps:

1. A set of neighborhood sizes for least squares fit is chosen, with relative weighting factors.

2. The image is transformed by a homoscedastic transformation through a lookup table, so that all the pixels have identical variances.

3. The image is padded with textured patterns horizontally and vertically all around the original image.

4. The "image pipeline" initialization is performed at the first line where the neighborhood fits completely by initializing and calculating all the necessary variables for the pipeline calculations.

5. The line pipeline" initialization is performed at the first pixel where the neighborhood fits completely, for each line in the image by updating all the necessary variables for the subsequent line pipeline calculations.

6. For each pixel in the line, the pipeline calculations are performed recursively from the preceding pixel until the last pixel for which the neighborhood fits completely. The pipeline calculations consist of computing the fit parameters, goodness of the fit, and the reconstruction of the fitted values.

7. For each line in the image, steps 5 and 6 are performed until the last line for which the neighborhoods fit completely.

8. Steps 4 to 7 are applied for each neighborhood size.

9. The noise reduced output pixel value is computed from the combination of the original pixel value and the contribution from the various neighborhood reconstructions with their relative weights.

10. Finally, the processed image undergoes an inverse of the homoscedastic transformation by a lookup table to yield a noise suppressed image.

From the foregoing, it can be seen that it is a primary object of the present invention to provide an improved method and an implementing system for utilizing pipeline calculations to compute recursively the fit parameters for removing noise components from a digital image signal without degrading edge values.

It is a further object of the present invention to provide an efficient method to compute recursively the goodness of the fit and the estimation of the fitted values in the reconstruction of the digital image.

It is an additional object of the present invention to provide an improved method for reducing noise in the smooth regions of a digital image based on least squares regression and an improved pipeline calculation with efficiency that is independent of the image block size.

These and other objects of the present invention will become more apparent from the following description when taken in conjunction with the attached drawings wherein like characters indicate like parts and which drawings form a part of the present description.

BRIEF DESCRIPTION OF THE DRAWINGS

FIG. 1 is a diagram illustrating a local neighborhood of a single band image comprised of $(2m+1) \times (2m+1)$ pixels as part of a total image.

FIG. 2 is a diagram illustrating a pipeline calculation for the $(2m+1) \times (2m+1)$ neighborhood size depicted in FIG. 1, with m selected equal to 2 and neighborhood pixels centered at (x,y).

FIG. 5 is a diagram illustrating a few overlapping neighborhoods which contain the pixel located at (x,y).

FIG. 6 is a diagram illustrating the first and the last pixel positions for the pipeline calculations of the fit parameters and the reconstruction. The valid image areas for the fit parameters and the reconstruction are illustrated.

DESCRIPTION OF THE PREFERRED EMBODIMENT

Figure 3:
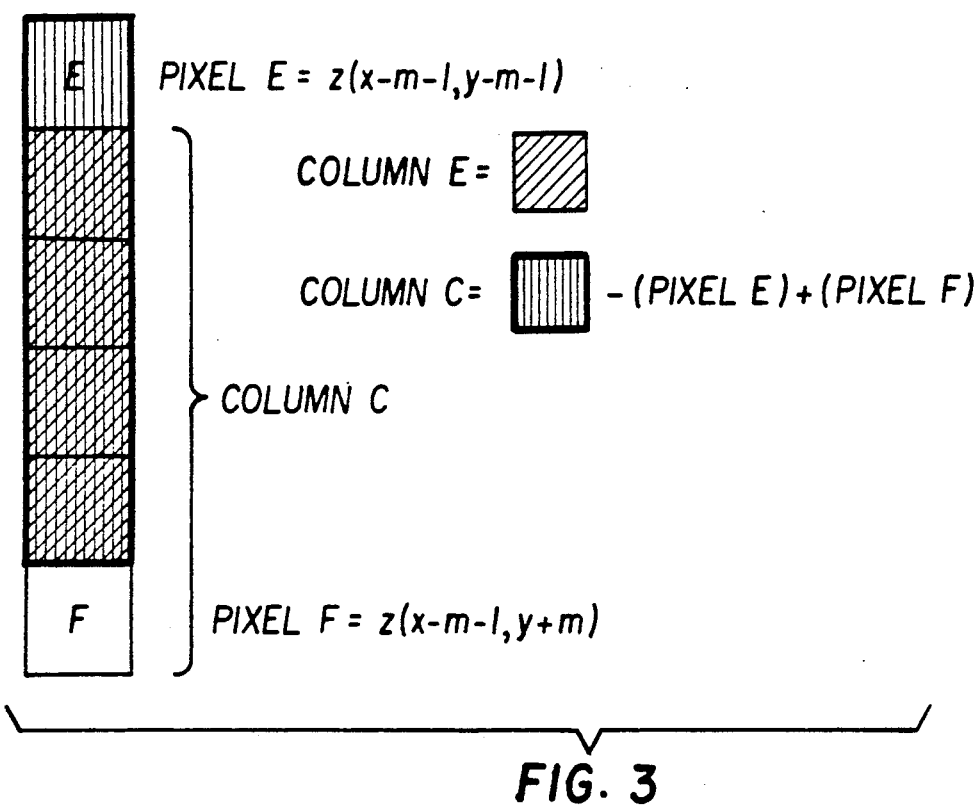
FIG. 3 is a diagram illustrating the pipeline calculation for the column C described in FIG. 2.

An understanding of the technique of least squares fitting of a plane is helpful in understanding the present invention. In particular, the recursive nature of the calculation of the fit parameters, goodness of the fit, and the estimation of the fitted parameters. As an aid in that understanding a least squares fit of a plane will be explained. The pipeline process of the least squares fit, employing a single neighborhood size, is applied to a single band image where noise variances are identical for all the pixels. The method is generalized to process a single band image with multiple neighborhood sizes. The method is extended to process an image whose noise variance is not identical for all the pixels. The method is also generalized to process a multi-band image employing either a single neighborhood size or multiple neighborhood sizes. Finally, additional recursive relations necessary for a higher order least squares fit are derived.

Plane Fit of an Image

First, consider the least squares fit of a plane employing a single neighborhood size applied to a single band image where noise variances are identical for all the pixels. FIG. 1 is a diagram showing a local neighborhood A of $(2m+1) \times (2m+1)$ with its local coordinate center (i=0, j=0) located at (x,y) in the image B. As shown in FIG. 1, the local coordinate system is described by i,j and the image coordinate system is described by x,y. Let $z = z(x,y)$ be a pixel value at (x,y). A pixel value z expressed as $z_{ij}$ in the local coordinate system is represented in the image coordinate as:

$$z_{ij} = z(x+i, y+j) \qquad (1)$$

where the values of i,j are integers ranging from $-m$ to m.

The least squares fit of a plane to a square neighborhood of $(2m+1) \times (2m+1)$ is obtained by minimizing the error function defined by:

$$\chi^2 = \frac{1}{\nu} \sum_{i=-m}^{m} \sum_{j=-m}^{m} \frac{(z_{ij} - a - bi - cj)^2}{\sigma^2} \qquad (2)$$

where $\sigma^2$ is the variance of the pixel at (i,j), and $\nu$ is the number of degrees of freedom, given as $\nu = [(2m+1)^2 - 3]$. To avoid division at every pixel, $\sigma^2$ is factored out in equation (2), and the error function becomes:

$$\chi^2 = \frac{1}{\nu \sigma^2} \sum_{i=-m}^{m} \sum_{j=-m}^{m} (z_{ij} - a - bi - cj)^2 \qquad (3)$$

The minimization of $\chi^2$ is done with respect to the fit parameters a,b,c. The equations are simplest when the square neighborhoods contain an odd number of pixels ((hence the choice of $(2m+1)\times(2m+1)$ neighborhoods.)) Then the following relations hold:

$$\sum_{i=-m}^{m}\sum_{j=-m}^{m} i = \sum_{i=-m}^{m}\sum_{j=-m}^{m} j = \sum_{i=-m}^{m}\sum_{j=-m}^{m} ij = 0 \qquad (4)$$

The solution of the fit parameters are obtained as follows:

$$\hat{a} = \frac{\sum_{i=-m}^{m}\sum_{j=-m}^{m} z_{ij}}{N_a} = \frac{A_2}{N_a} \qquad (5)$$

$$\hat{b} = \frac{\sum_{i=-m}^{m}\sum_{j=-m}^{m} iz_{ij}}{N_{1a}} = \frac{B_2}{N_{1a}} \qquad (6)$$

$$\hat{c} = \frac{\sum_{i=-m}^{m}\sum_{j=-m}^{m} jz_{ij}}{N_{1a}} = \frac{C_2}{N_{1a}} \qquad (7)$$

where the constants:

$$N_a = (2m+1)^2 \qquad (8)$$

$$N_{1a} = \frac{m(m+1)(2m+1)^2}{3} \qquad (9)$$

and $A_2$, $B_2$, $C_2$ are the symbols for the double summations.

Figure 4:
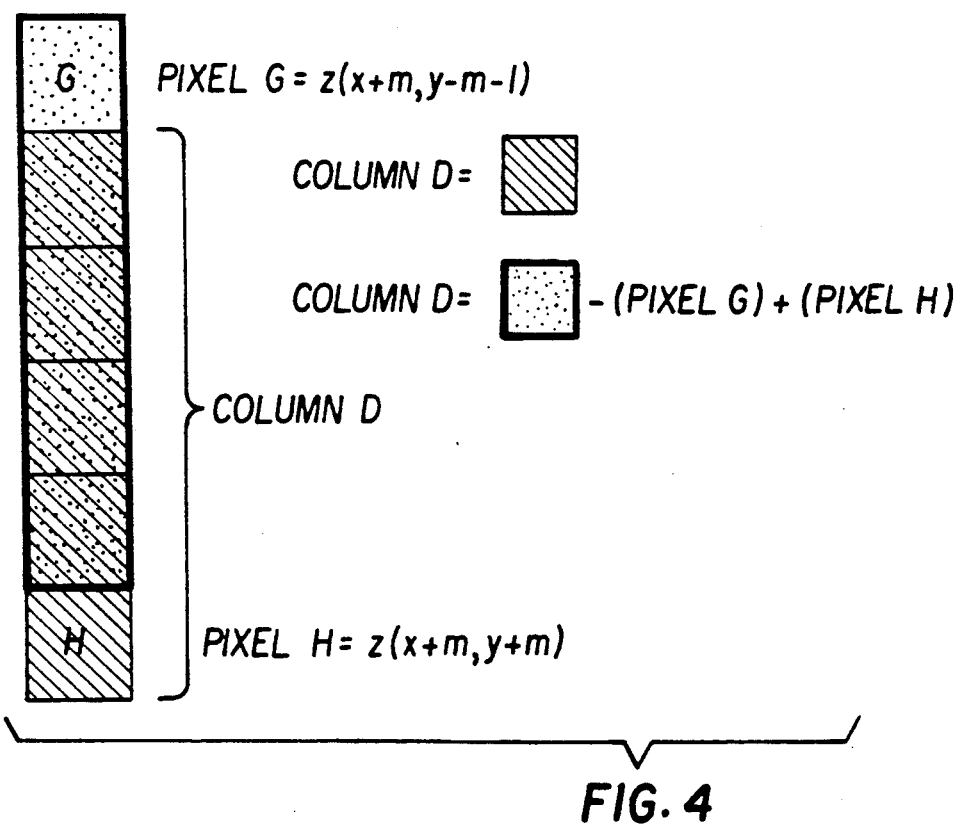
FIG. 4 is a diagram illustrating the pipeline calculation for the column D described in FIG. 2.

It is important to recognize that the summations to get the fit parameters $\hat{a},\hat{b},\hat{c}$ in equations (5-7) are in fact convolutions, when it is considered that the computation will be repeated for this sized neighborhood centered at each point in the image. The convolutions can be carried out efficiently by using a sliding sum, or a recursive relation which makes use of the fact that the convolution result at each pixel (x,y) is related to the result obtained for the previous pixel at (x-1,y). This recursive computation is depicted in FIGS. 2-4.

Pipeline Calculation of the Fit Parameters

Let's consider the computation of $\hat{a}$ at the pixel location (x,y) in the image. Let, $$A_1(x,y) = \sum_{j=-m}^{m} z(x,y+j) \qquad (10)$$

and $$A_2(x,y) = \sum_{i=-m}^{m}\sum_{j=-m}^{m} z(x+i,y+j) \qquad (11)$$

be the summation function of the pixel values. $A_1$ is the summation function of the pixel values along the column centered at (x,y) and $A_2$ is the summation function over the whole neighborhood centered at (x,y). The recursive calculation of $A_2$ is described in the following equation:

$$A_2(x,y) = A_2(x-1,y) - A_1(x-m-1,y) + A_1(x+m,y) \qquad (12)$$

Furthermore, $A_1$ can be computed recursively, using the equation described below:

$$A_1(x,y) = A_1(x,y-1) - z(x,y-m-1) + z(x,y+m) \qquad (13)$$

FIG. 2 illustrates two 5×5 neighborhoods centered at (x-1,y) and (x,y) respectively. $A_2(x,y)$ which is represented by the slash marks leaning to the left is calculated from $A_2(x-1,y)$ which is represented by the slash marks leaning to the right, $A_1(x-m-1,y)$ which is represented as the column C, and $A_1(x+m,y)$ which is represented as the column D. FIG. 3 depicts how the column C in FIG. 2 is calculated recursively using equation (13). $A_1(s-m-1,y)$ represented by the slash marks leaning to the right in FIG. 3 is calculated from $A_1(s-m-1,y-1)$ which is represented by the vertical marks, the pixel $z(s-m-1,y-m-1)$ which is represented by E, and the pixel $z(s-m-1,y+m)$ which is represented by F. Likewise, FIG. 4 depicts how the column D in FIG. 2 is calculated recursively using equation (13). $A_1(x+m,y)$ represented by the slash marks leaning to the left in FIG. 4 is calculated from $A_1(x+m,y-1)$ which is represented by the dots, the pixel $z(x+m,y-m-1)$ which is represented by G, and the pixel $z(x+m,y+m)$ which is represented by H.

The pipeline calculation of the fit parameter $\hat{a}$ is done by employing equations (10-13). First, $A_1$ is updated at the leading edge of the block, namely at (x+m,y). Then $A_2$ is computed from the previously computed results of $A_1$ and $A_2$. The number of operations is reduced from $(4m^2+4m)$ additions for the straight summation to 2 additions and 2 subtractions for the pipeline calculation.

The pipeline calculation of the fit parameter $\hat{b}$ is performed in a very similar manner as the pipeline calculation of the fit parameter $\hat{a}$. Let:

$$B_2(x,y) = \sum_{i=-m}^{m}\sum_{j=-m}^{m} iz(x+i,y+j) \qquad (14)$$

Then recursive computation of $B_2$ is given by the equation below:

$$B_2(x,y) = B_2(x-1,y) + m\{A_1(x-m-1,y) + A_1(x+m,y)\} - \{A_2(x-1,y) - A_1(x-m-1,y)\} \qquad (15)$$

The number of operations is reduced from $(Jm^2+4m+1)$ multiplications and $(4m^2+4m)$ additions to 1 multiplication, 2 subtractions, and 2 additions.

The pipeline calculation of the fit parameter $\hat{c}$ is performed also in a very similar manner to the pipeline calculation of the fit parameter $\hat{a}$. To compute $\hat{c}$, define:

$$C_1(x,y) = \sum_{j=-m}^{m} jz(x,y+j) \qquad (16)$$

and $$C_2(x,y) = \sum_{i=-m}^{m}\sum_{j=-m}^{m} jz(x+i,y+j) \qquad (17)$$

The recursive computation of $C_1$ is given by the following equation:

$$C_1(x,y) = C_1(x,y-1) + m\{z(x,y-m-1) + z(x,y+m)\} - \{A_1(x,y-1) - z(x,y-m-1)\}$$

Then the recursive computation of $C_2$ is done as follows:

$$C_2(x,y) = C_2(x-1,y) - C_1(x-m-1,y) + C_1(x+m,y)$$

The pipeline calculation of the fit parameter $\hat{c}$ reduces the number of operations from $(4m^2+4m+1)$ multiplications and $(4m^2+4m)$ additions to 1 multiplication, 3 subtractions, and 3 additions.

It is thus shown that to calculate the fit parameters of the least squares fit of a plane, a recursive pipeline process can be employed according to equations (10–19). Moreover the pipeline calculation method is very efficient as one can see from the consideration of the number of operations involved in the pipeline process.

Goodness of Fit and Its Pipeline Calculation

There are two useful numbers resulting from the fit. They are the estimate of the fit $\hat{z}_{ij}$ and the goodness of the fit $\chi^2$. The plane fitted value $\hat{z}_{ij}$ at (i,j) is given in terms of the fit parameters $a,b,c$ as follows:

$$\hat{z}_{ij} = \hat{a} + \hat{b}i + \hat{c}j$$

The goodness of fit $\chi^2$ is given by:

$$\chi^2 = \frac{1}{\nu}\left( \frac{1}{\sigma^2} \sum_{i=-m}^{m}\sum_{j=-m}^{m} (z_{ij} - \hat{z}_{ij})^2 \right) \quad (21)$$

where $z_{ij}$ is the unprocessed image value at (i,j), $\sigma^2$ is the noise variance value, and $\nu$ is the number of degrees of freedom given as $\nu=[(2m+1)^2-3]$.

The pipeline calculation of $\chi^2$ can be achieved if the summation is expressed as shown below:

$$\sum_{i=-m}^{m}\sum_{j=-m}^{m}(z_{ij}-\hat{z}_{ij})^2 = \left(\sum_{i=-m}^{m}\sum_{j=-m}^{m} z_{ij}^2\right) - N_\alpha (\hat{a})^2 - N_{1\alpha}(\hat{b})^2 - N_{1\alpha}(\hat{c})^2 \quad (22)$$

where $N_\alpha$ and $N_{1\alpha}$ are given in equation (8) and (9) respectively. When the first term of equation (22) is written as:

$$\sum_{i=-m}^{m}\sum_{j=-m}^{m} z_{ij}^2 = \sum_{i=-m}^{m}\sum_{j=-m}^{m} t_{ij} = \sum_{i=-m}^{m}\sum_{j=-m}^{m} t(x+i, y+j), \quad (23)$$

then the pipeline calculation is performed from the equations (10, 11, 12, 13) when z is replaced by t in the definitions of equations (10, 11, 12, 13). The pipeline calculation involves only 1 multiplication, 2 additions, and 2 subtractions for the summation. The other terms on the right hand side of the equation (22) come almost free since the fit parameters $\hat{a},\hat{b},\hat{c}$ are already computed.

The least squares fit by a plane forces the fitting surface to be planar and thus smooths the noisy image. A plane is a good model for uniform areas in the image, but not a good model for edges. When the local image contains edges, the planar fit is not good, resulting in a large $\chi^2$ value, and the plane fit will result in blurring of the edge. To avoid blurring edges, the goodness of fit $\chi^2$ is used in reconstructing the image, such that at a given pixel, regions with "good fit" (small $\chi^2$ value) will contribute more to the final pixel value than regions with "bad fit" (large $\chi^2$ value). Since the fitted value has little meaning in "bad fit", it is reasonable to associate a small weight to the fit in reconstructing the pixel value. In general, the weight is some function of $\chi^2$ such that the weight is large for small $\chi^2$, and small for large $\chi^2$. We have used an exponential function $e-p\chi^2$ where p is a free parameter. Good results are obtained with this function. In actual implementation, the weights (exponential function) are calculated once for various possible values of $\chi^2$ and stored in a lookup table to avoid repeatedly computing an exponential. The equation to generate a lookup table is given as follows:

$$\omega = fe^{-p\chi^2} \quad (24)$$

where f is the relative weighting factor for the $(2m+1)\times(2m+1)$ neighborhood with respect to unit weighting factor for the unprocessed pixel value in reconstruction of the output pixel value.

For a given neighborhood centered at (x,y) in the image, the pipeline calculation of the goodness of fit $\chi^2(x,y)$ is performed and converted to the weight $\omega(x,y)$ through a lookup table.

Reconstruction of The Image and Its Pipeline Calculation

For a given point (x,y) in the image, there will be $(2+1)^2$ fitted values from a $(2m+1)\times(2m+1)$ neighborhood type. FIG. 5 illustrates three out of the 25 overlapping neighborhoods when a $5\times5$ neighborhood size is employed. The pixel value at (x,y) is reconstructed by summing up all the fitted value $\hat{z}_{ij}$ with the corresponding weights $\omega_{ij}$ of the fit for all the neighborhoods of various centers which contain the pixel (x,y). Referring to FIG. 5, FIG. 1, and Equation (1) for the relation of the local coordinate (i,j) and the image coordinate (x,y), and since the fit parameters and the weights are associated at the center of each neighborhood, the plane fitted value corresponding to the weight $\omega_{ij}$ will be $\hat{z}_{(-i)(-j)}$.

The output pixel $z$ is calculated by combining the unprocessed pixel value z and the weighted average of the plane fitted value $\hat{z}_{ij}$ as follows:

$$z = \frac{z + \sum_{i=-m}^{m}\sum_{j=-m}^{m} \omega_{ij}\hat{z}_{(-i)(-j)}}{1 + \sum_{i=-m}^{m}\sum_{j=-m}^{m} \omega_{ij}} \quad (25)$$

This is weighted sum of the unprocessed pixel value and the plane fitted values where a weight of 1 is given to the unprocessed pixel. When equation (25) is expressed in terms of the fit parameters, it is given as follows:

$$z = \frac{z + \sum_{i=-m}^{m}\sum_{j=-m}^{m}(\omega_{ij}\hat{a}_{ij}) - \sum_{i=-m}^{m}\sum_{j=-m}^{m} i(\omega_{ij}\hat{b}_{ij}) - \sum_{i=-m}^{m}\sum_{j=-m}^{m} j(\omega_{ij}\hat{c}_{ij})}{1 + \sum_{i=-m}^{m}\sum_{j=-m}^{m}\omega_{ij}} \quad (26)$$

It is again important to recognized that all four double summations in equation (26) are convolutions and the same pipeline calculation methods described earlier can be employed to compute the estimation. The three double summations in the numerator of equation (26) can be written as follows:

$$\sum_{i=-m}^{m}\sum_{j=-m}^{m}(\omega_{ij}\hat{a}_{ij}) = \sum_{i=-m}^{m}\sum_{j=-m}^{m}p_{ij} \quad (27)$$

$$\sum_{i=-m}^{m}\sum_{j=-m}^{m}i(\omega_{ij}\hat{b}_{ij}) = \sum_{i=-m}^{m}\sum_{j=-m}^{m}iq_{ij} \quad (28)$$

$$\sum_{i=-m}^{m}\sum_{j=-m}^{m}j(\omega_{ij}\hat{c}_{ij}) = \sum_{i=-m}^{m}\sum_{j=-m}^{m}jr_{ij} \quad (29)$$

It is apparent in these forms that the pipeline calculation method described earlier can be used in evaluating all the terms in the numerator and the denominator of equation (26) to reconstruct the final pixel values. The pipeline calculation of the first double summation in the numerator of equation (26), reexpressed in equation (27), is performed from the equations (10-13) when z is replaced by p in the definitions of $A_1$ and $A_2$. The pipeline calculation of the second double summation in the numerator of equation (26), reexpressed in equation (28), is performed from the equations (10-15) replacing z by q in the definitions of $A_1$, $A_2$, and $B_2$. The pipeline calculation of the third double summation in the numerator of equation (26), reexpressed in equation (29), is performed from the equations (10-13,16-19) with z replaced by r in the definitions of $A_1$, $A_2$, $C_1$, and $C_2$. Finally, the pipeline calculation of the double summation in the denominator in equation (26) is performed from the equations (10-13) when z is replaced by w in the definitions of $A_1$, and $A_2$. Thus the pipeline calculations are done for all the double summations in equation (26) to reconstruct the pixel at (x,y).

It has been shown that the pipeline calculation can be performed in the computation of the fit parameters $\hat{a},\hat{b},\hat{c}$, goodness of the fit $\chi^2$, and the reconstruction of the final value $\hat{z}$. The computational speed is greatly enhanced since the pipeline calculations are performed in all phases of the algorithm.

It should also be noted that the number of operations in the pipeline calculation method for the fit parameters, goodness of the fit, and the reconstruction is almost independent of the neighborhood size. Since there is some overhead associated with pipeline initialization at the beginning of the image and the beginning of each line, the actual computation is not totally independent of the neighborhood size, but for large images it is close. The processing involving a 41×41 neighborhood is performed as fast as the processing involving a 5×5 neighborhood. Hence, the pipeline calculation advantage becomes more when a larger neighborhood is employed.

FIG. 6 is a diagram illustrating the first and the last valid pixel positions for the pipeline calculations in the case of a 5×5 neighborhood size. The input image is indicated by J. The shaded pixels are the center pixels of the four corner neighborhoods where the 5×5 neighborhood pixels fit completely within the image J. The area K bounded by these shaded pixels represents the valid pixels for the fit parameters and the goodness of the fit. The reconstruction of a final pixel is done using the valid pixels for the fit parameters. The black pixels are the center pixels of the four corner neighborhoods where the 5×5 neighborhood fits completely within the area K. The area L bounded by these black pixels represents the valid output pixels for reconstruction. Hence, the valid output image L is smaller than the input image J by 8 pixels and 8 lines.

Figure 7:
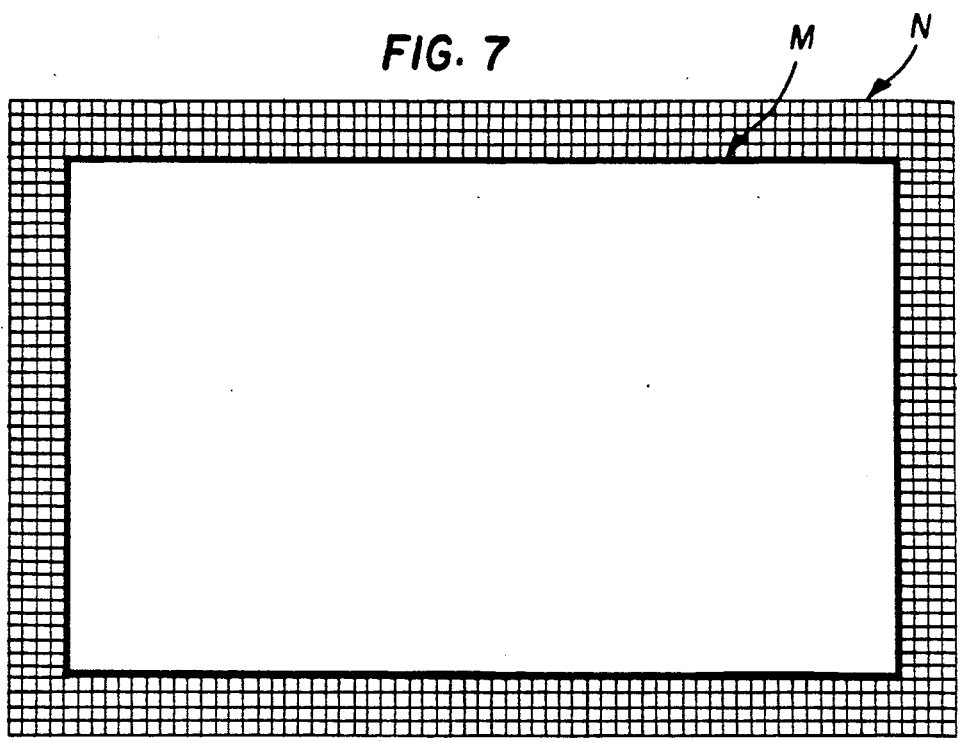
FIG. 7 is a diagram illustrating the padding of the original image.

FIG. 7 is a diagram for forming a larger image from the original image (padding) to make the valid output image size the same as the original image size. It is accomplished by padding the original image M all around with pixels which results in an image N. The amount of the horizontal padding at each end is by one pixel less than the length of the neighborhood. The amount of the vertical padding at each end is one pixel less than the height of the neighborhood. The padding is done with a highly textured pattern so that a neighborhood containing the padded pixels will result in a "bad fit". The corresponding weight for the bad fit will be negligibly small. Hence, the contribution of the badly fitted value will be negligible to the final reconstruction.

Figure 8:
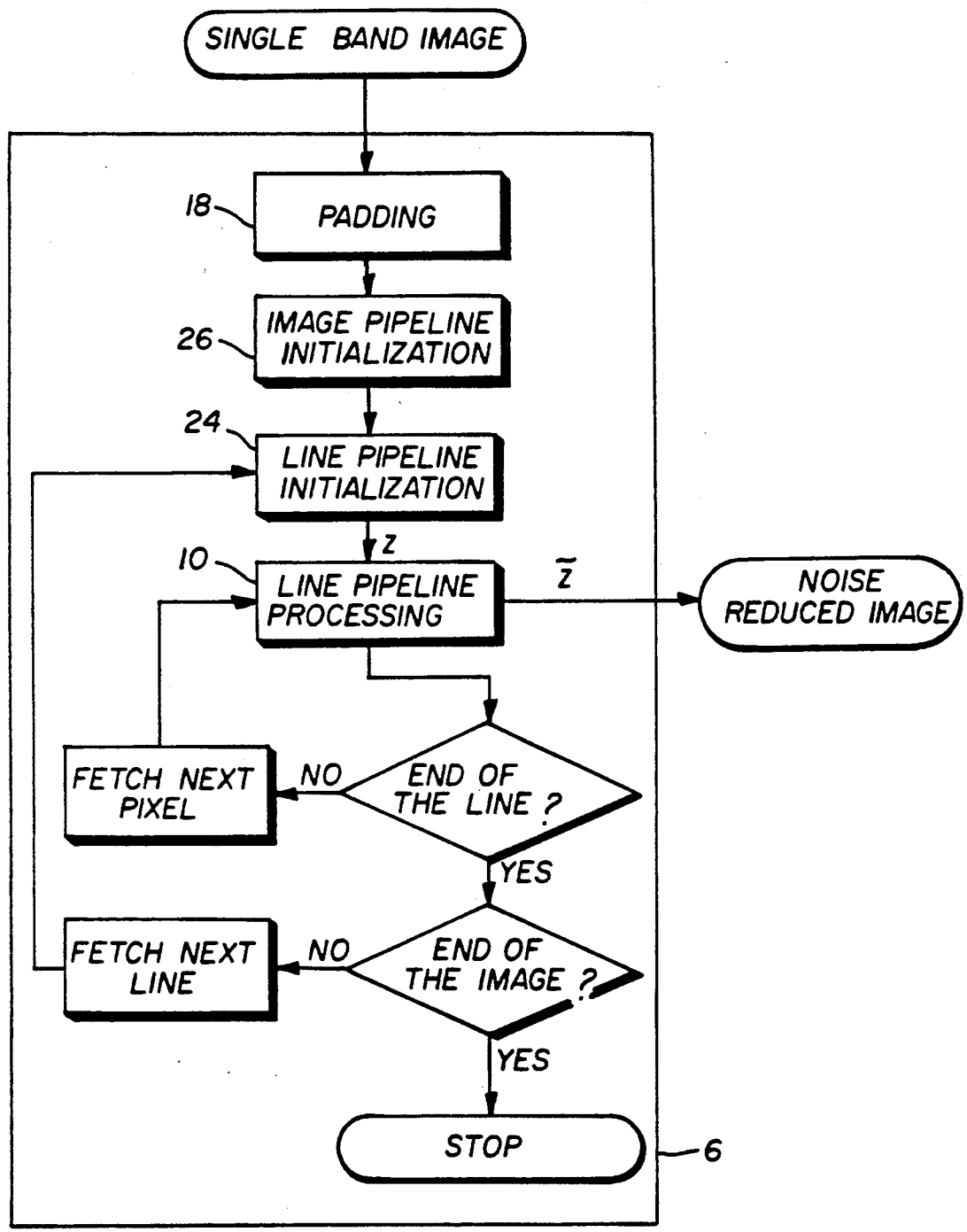
FIG. 8 is a block diagram illustrating the method steps of the present invention of recursive pipeline calculation of the algorithm to process a single band image with homogeneous noise variances.
Figure 9:
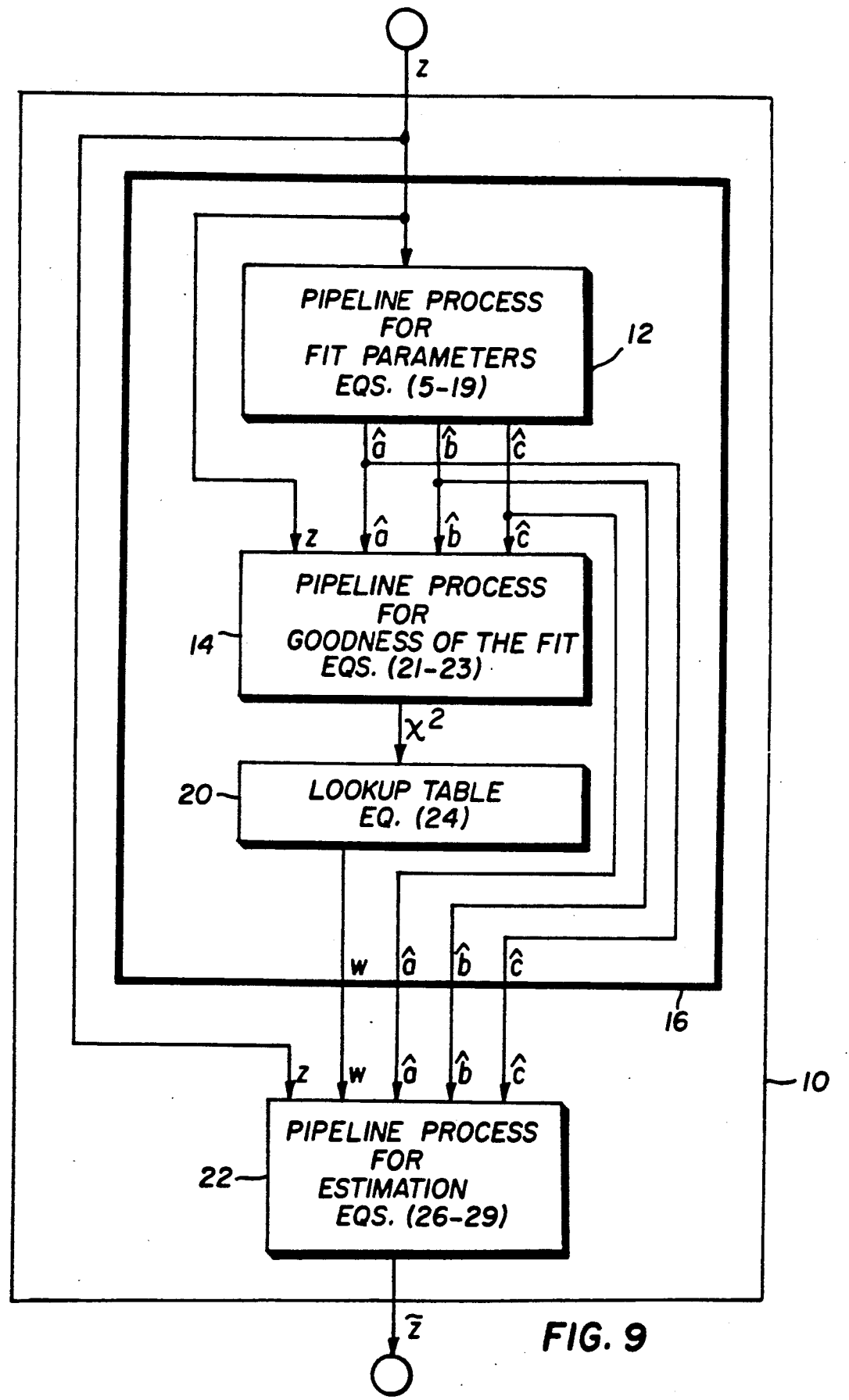
FIG. 9 is a block diagram illustrating the details of the line pipeline processing shown in FIG. 8.

FIG. 8 is a block diagram illustrating the method steps of the present invention, in flow chart form, for processing a single band image whose noise variances are identical for all the pixels. The original single band image is processed with the image pipeline processing 6 to produce the noise reduced image. In the image pipeline processing 6, the original single band image is padded in block 18 as illustrated in FIG. 7. Since the pipeline calculations described earlier take advantage of the calculations done for the previous pixels and the previous lines, it is necessary to have a start-up procedure at the beginning of the image and at the beginning of each line to be processed. This is performed in the image pipeline initialization 26 and the line pipeline initialization 24. The first and the last pixels for the pipeline calculations are illustrated in FIG. 6. The image pipeline initialization is performed in block 26 at the first line where the neighborhood fits completely within the padded image. All the fit parameters and the goodness of the fits are then calculated. At the first line where the neighborhood fits completely within the valid image area for the fit parameters, all the summations and initialization for the pipeline calculation of the reconstruction are done. The line pipeline initialization is performed in block 24 for the fit parameters and the goodness of the fit at the first pixel where the neighborhood fits completely within the padded image. The line pipeline initialization 24 also includes the initialization for the reconstruction at the first pixel where the neighborhood fits completely within the valid image area of the fit parameters. All the initialization consists of updating the summations necessary for the subsequent pipeline calculations. Once the line pipeline initialization is done, the line pipeline processing 10 is performed for all the pixels in the line until the last pixel in the line where the neighborhood fits completely within the valid pixels. The details of the line pipeline processing 10 are illustrated in FIG. 9. The line pipeline initialization 24 and the line pipeline processing 10 are performed for each line in the image until the last line for the condition where the neighborhood fits completely within the valid image area. The output of the line pipeline processing 10 is the noise reduced image.

FIG. 9 is a block diagram illustrating the details of the line pipeline processing 10 in FIG. 8. For each pixels in the line, the pipeline calculations of the fit parameters $\hat{a},\hat{b},\hat{c}$ are performed in block 12 according to equations (5-19). The pipeline calculation of the goodness of the fit is performed in block 14 from equations (21-23) utilizing equations (5-19). A weight value is obtained from a lookup table 20 constructed according to equation (24). The outputs of the block 16 are the fit parameter $\hat{a},\hat{b},\hat{c}$ and the weight associated with the fit for a given neighborhood size. The pipeline calculations in the estimation of the final pixel value is performed in block 22 according to equations (26-29) utilizing equations (10-19).

Processing an Image Employing Multiple Neighborhood Sizes

Figure 10:
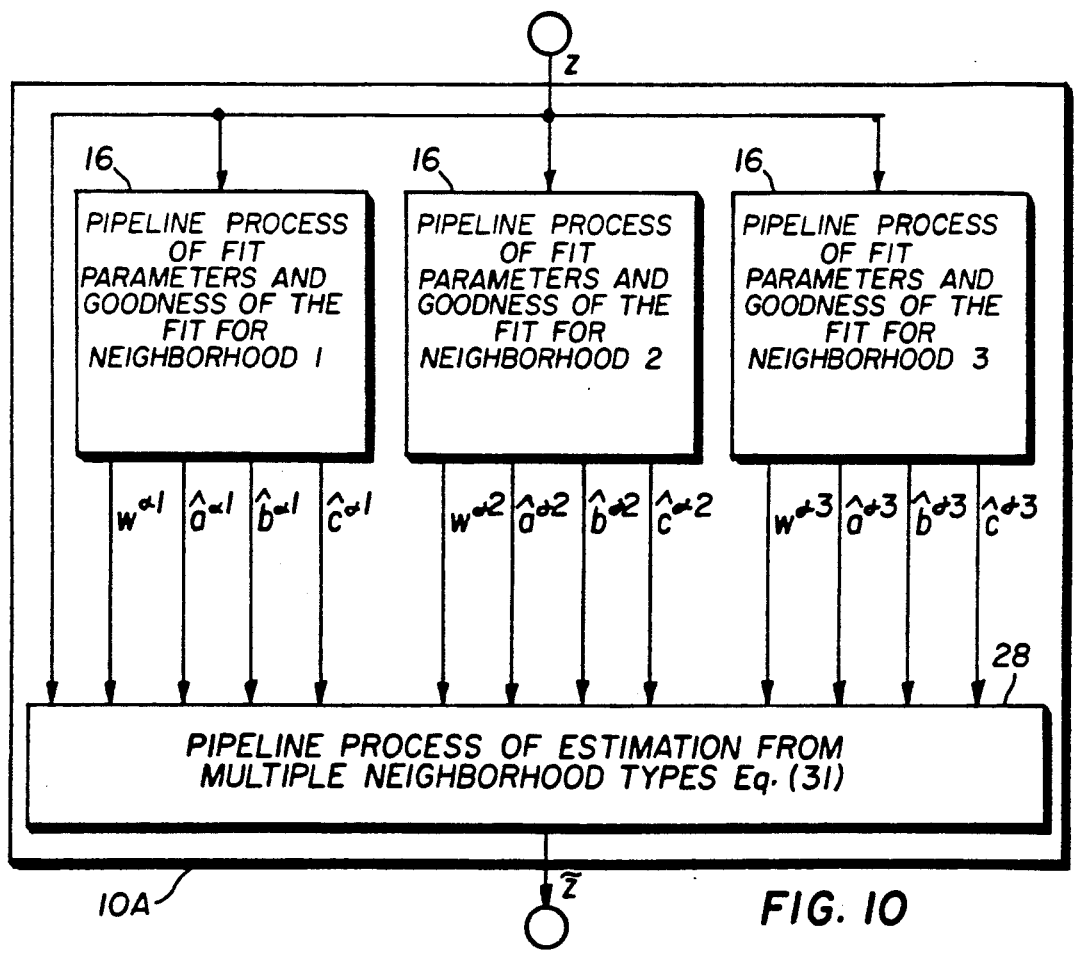
FIG. 10 is a block diagram illustrating the details of the line pipeline processing in FIG. 8 to process a single band image with multiple neighborhood sizes.

FIG. 10 is a block diagram illustrating the line pipeline processing 10A for processing a single band image with multiple neighborhood sizes when the block 10A replaces the block 10 in FIG. 8. The advantage of employing multiple neighborhood sizes is that it can handle fine, medium, and coarse details of an image by fitting small, medium, and large planes. Typically, 5×5, 11×11, 21×21 neighborhood sizes are employed. For each neighborhood $\alpha$, the fit parameters $\hat{a}^\alpha, \hat{b}^\alpha, \hat{c}^\alpha$ and the goodness of the fit $\chi_\alpha^2$ are calculated independently from the pipeline processing 16 in FIG. 9. The weight of the fit for each neighborhood is obtained from a lookup table 20 in FIG. 9 which contains values calculated according to:

$$\omega^{60} = f_\alpha e^{-p_\alpha \omega^{2\alpha}} \quad (30) \text{ ps}$$

where $f_\alpha$ controls the relative overall weight for neighborhood type $\alpha$, and $p_\alpha$ are free parameters, typically with values of 1. Finally, the contribution from all the overlapping neighborhoods of all neighborhood types are combined in block 28 to produce an output pixel value as follows:

$$z = \frac{z + \sum_{\alpha=1}^{l} \sum_{i,j=-m}^{m} (\omega_{ij}^\alpha a_{ij}^\alpha) - \sum_{\alpha=1}^{l} \sum_{i,j=-m}^{m} i(\omega_{ij}^\alpha b_{ij}^\alpha) - \sum_{\alpha=1}^{l} \sum_{i,j=-m}^{m} j(\omega_{ij}^\alpha c_{ij}^\alpha)}{1 + \sum_{\alpha=1}^{l} \sum_{i,j=-m}^{m} \omega_{ij}^\alpha} \quad (31)$$

where $\alpha$ is an index for the neighborhood type, l is the number of different neighborhood sizes. The pipeline calculations depicted in equations (27-29) are performed for each neighborhood and then combined to yield the final noise reduced pixel value $\bar{z}$.

Processing an Image With Non-Homogeneous Noise Variances

Generally, noise variances of an image are not constant for the whole image. The pipeline process developed earlier can be applied to an image with non-homogeneous noise variances if a transformation is done to the image such that the transformed image will have constant noise variances for all the pixels. The error function in the least squares fit when noise variances are not identical for all the pixels is defined by:

$$\chi_\alpha^2 = \frac{1}{\nu_\alpha} \sum_{i=-m}^{m} \sum_{j=-m}^{m} \frac{(z_{ij} - a - bi - cj)^2}{\sigma_{ij}^2} \quad (32)$$

where $\alpha$ is an index for the chosen neighborhood type, $\sigma_{ij}^2$ is the variance of the pixel at (i,j), and $\nu_\alpha$ is the number of degrees of freedom for the neighborhood type $\alpha$ given as $[(2m+1)^2 - 3]$ when the size of the neighborhood $\alpha$ is $(2m+1)\times(2m+1)$. When the image is transformed by a homoscedastic transformation (see for example, R. J. Larsen and M. L. Marx, "Mathematical Statistics and Its Applications", Prentice-Hall, 1986.), $\sigma_{ij}^2$ becomes a constant factor $\sigma^2$ and the error function becomes:

$$\chi_\alpha^2 = \frac{1}{\nu_\alpha \sigma^2} \sum_{i=-m}^{m} \sum_{j=-m}^{m} (z_{ij} - a - bi - cj)^2 \quad (33)$$

Now all the methods described earlier can be applied to the transformed image.

Figure 11:
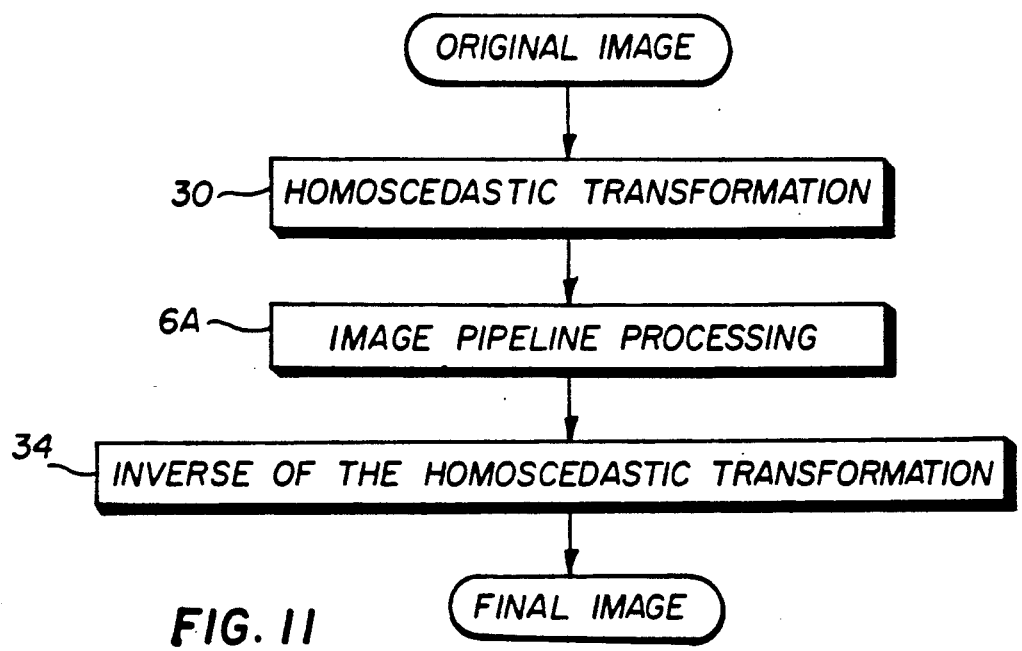
FIG. 11 is a block diagram illustrating the method steps of the present invention for processing a single band image whose pixels do not have identical variances.

FIG. 11 is a block diagram illustrating the method steps of the present invention to process a single band image in a more general case when the pixels do not have identical noise variances. The original image is transformed in block 30 by a homoscedastic transformation which may be implemented using a lookup table so that all the pixels have identical noise variances. The image pipeline processing 6A is performed on the transformed image. The image pipeline processing 6A is essentially the same as the image pipeline processing 6 in FIG. 8 wherein there is an option of employing either the line pipeline processing 10 in FIG. 9 for processing an image with a single neighborhood, or the line pipeline processing 10A for processing an image with multiple neighborhoods. The inverse of the homoscedastic transformation is performed in block 34 by another lookup table to yield the final noise reduced image.

Processing a Color Image Where Only Luminance Image is Processed

Figure 12:
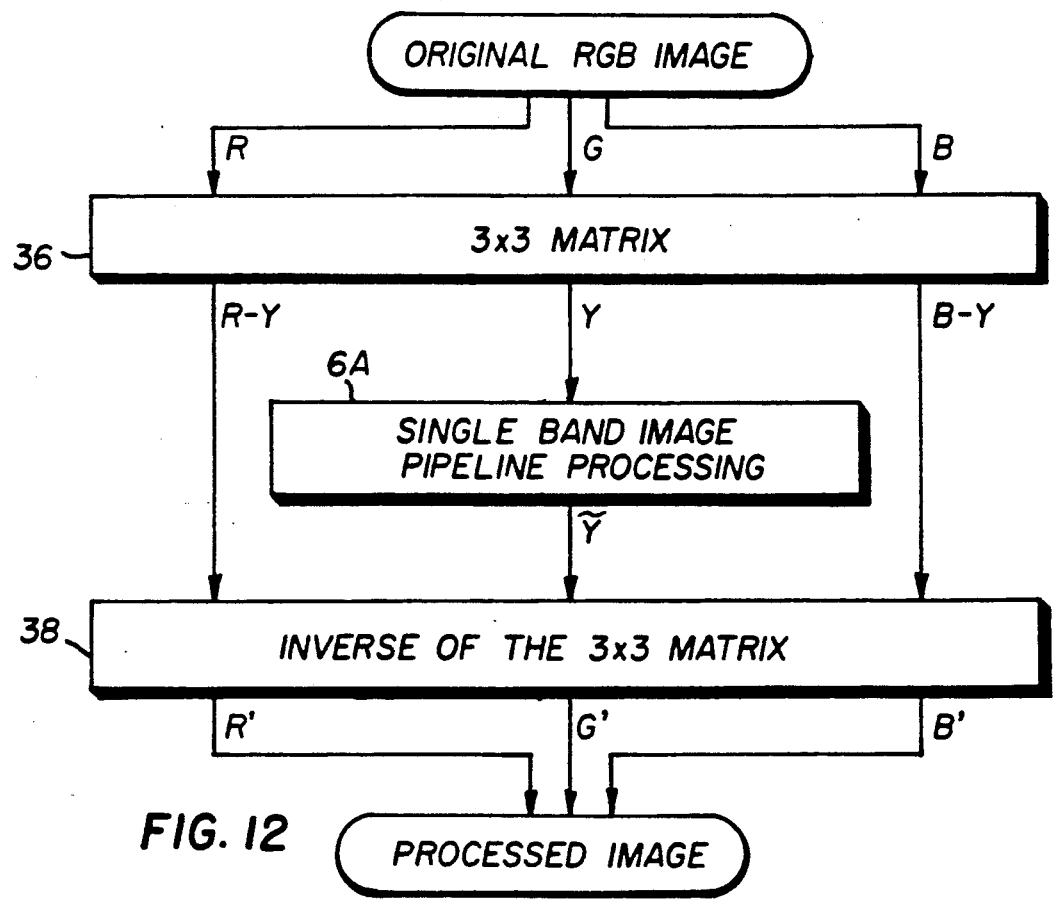
FIG. 12 is a block diagram illustrating the method steps for a variant of the present invention for color image processing, where only a luminance component is processed according to the method of processing a single band image.

In noise suppression of color images, it is often good enough to reduce the noise of the luminance component. Hence, the method to process a single band image is readily applicable to processing color images. FIG. 12 is a block diagram illustrating the method steps of the present invention for processing a color image wherein the luminance component image is processed according to the method of processing a single band image described earlier. The RGB image is first transformed by a 3×3 matrix 36 into the luminance image Y and the two chrominance images, (R−Y) and (B−Y). The luminance image Y undergoes the image pipeline process 6A in FIG. 11 resulting in the processed image $\bar{y}$. An inverse 3×3 matrix 38 transforms the signals (R−Y), $\bar{y}$, (B−Y) to the noise reduced R'G'B' image. If the noise variance is not constant, a homoscedastic transformation and an inverse transformation should be applied before and after the single band image pipeline processing 6A as shown in FIG. 11.

Processing Multi-Band Images

Figure 13:
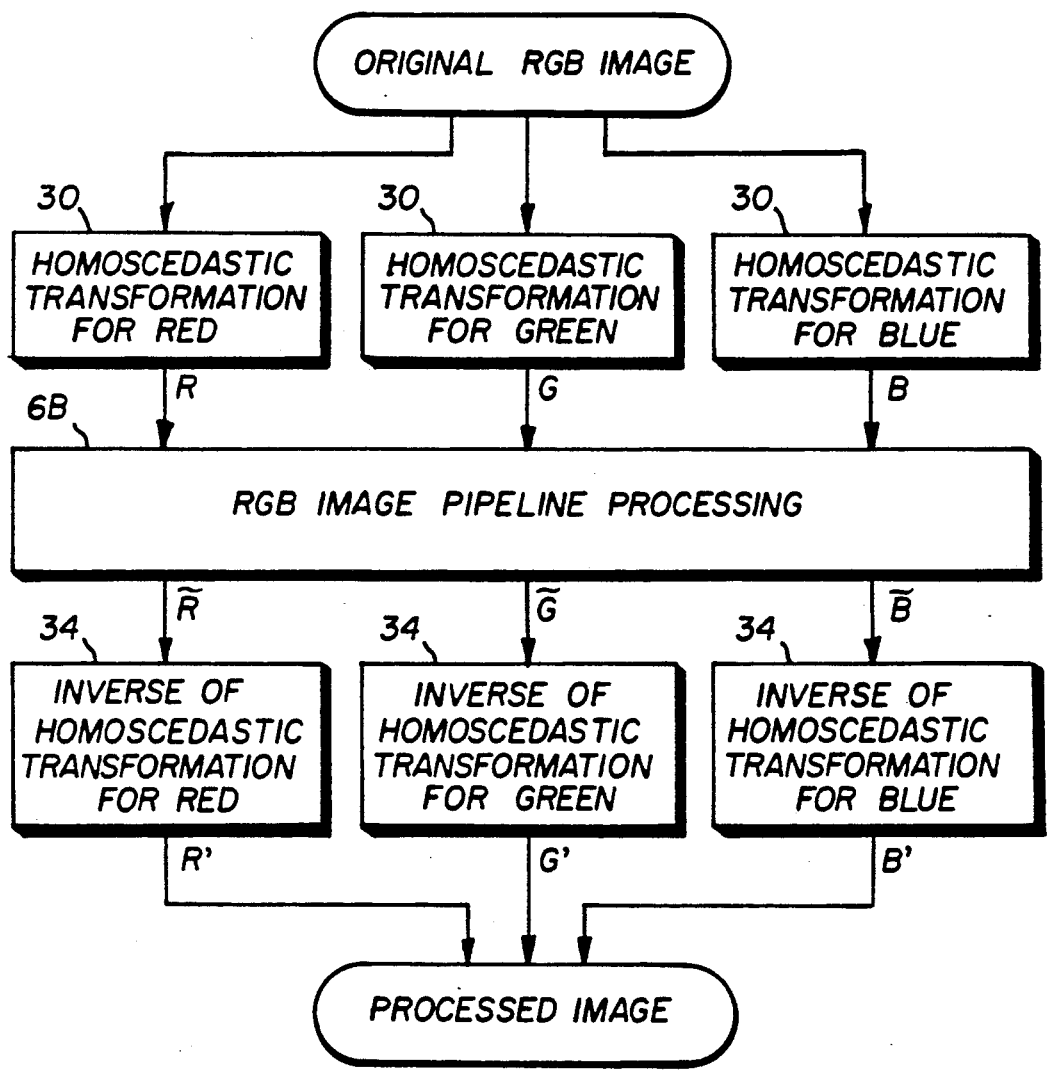
FIG. 13 is a block diagram illustrating the method steps of the present invention for processing a multi-band image.
Figure 14:
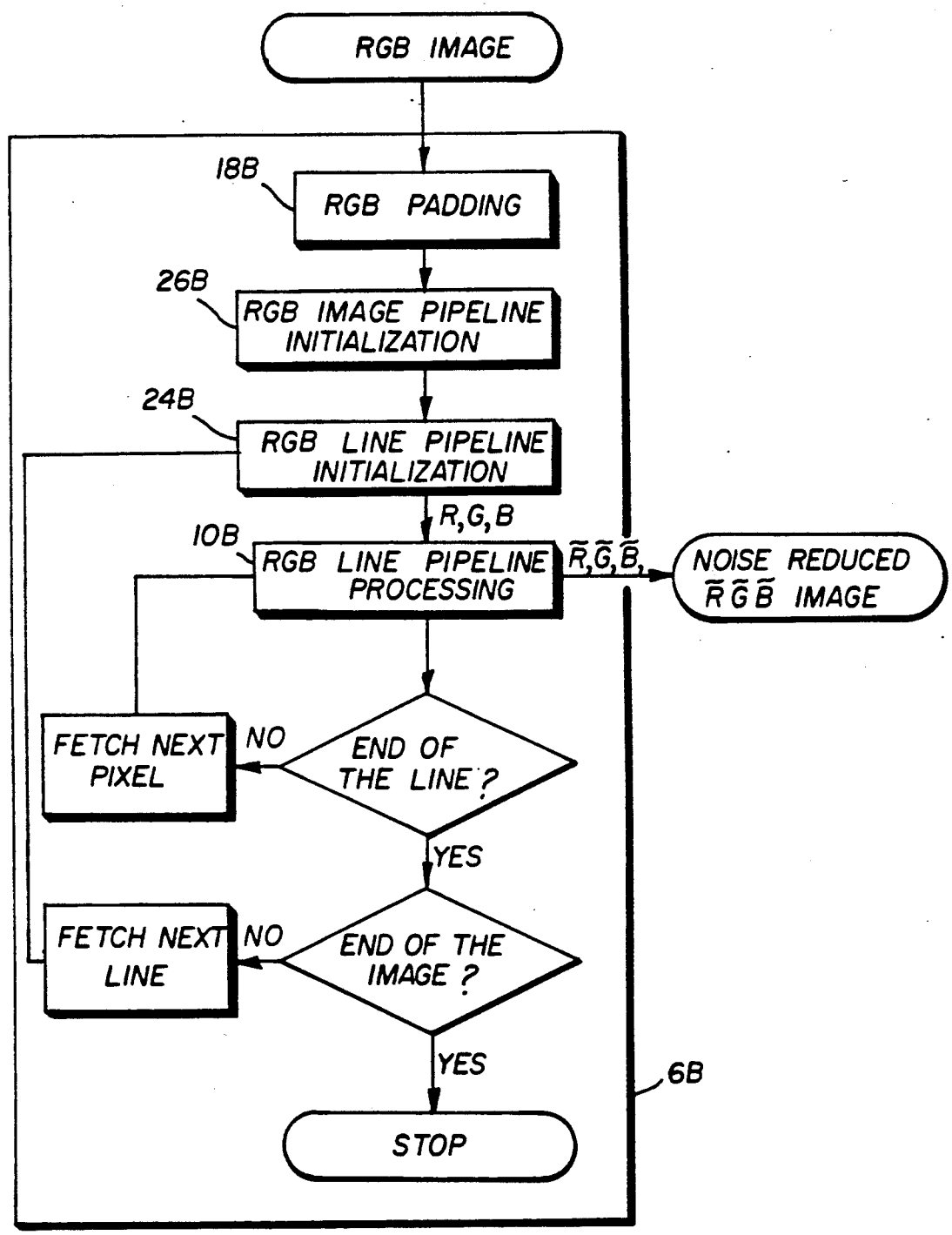
FIG. 14 is a block diagram illustrating the details of the RGB image pipeline processing in FIG. 13.

The basic pipeline method is also extendable to process multi-band images to reduce noise in all the bands. For multi-band images, it is assumed that there is no correlation of noise between different color bands. FIG. 13 is a block diagram illustrating the method steps of the present invention for processing a multi-band image in case of a color image with 3 bands (red, green, and blue). Each color band undergoes a separate homoscedastic transformation in blocks 30. Then the RGB image pipeline processing 6B whose details are shown in FIG. 14 is performed. An inverse of the homoscedastic transformation for each band is performed in blocks 34 resulting in the noise reduced final multiband image.

Since there is no correlation between the bands, least squares fit to the multi-band image is mathematically equivalent to separate least squares fit for each band. For a given neighborhood size, the fit parameters $\hat{a}^\beta, \hat{b}^\beta, \hat{c}^\beta$ are calculated for each band $\beta$. The multi-band goodness of the fit $\chi_m^2$ is the combination of the contribution from each band as shown below:

$$\chi_m^2 = \frac{1}{k} \sum_{\beta=1}^{k} \chi_\beta^2 \qquad (34)$$

where $\beta$ is the index for the band, k is the number of bands, and $\chi_\beta^2$ is the goodness of the fit for the band $\beta$. The weighting factor associated with goodness of the fit is then calculated as:

$$\omega = fe^{-p\omega m} \qquad (35)$$

where f is a relative overall weighting factor of the neighborhood, p is a free parameter, typical value of 1, and $\chi_m^2$ is the combined goodness of the fit. The reconstruction of the pixel $\bar{z}^\beta$ for the band $\beta$ is calculated from the fit parameters and the weights associated with fits from overlapping neighborhoods as follows:

$$\bar{z}^\beta = \qquad (36)$$

$$\frac{z^\beta + \sum_{i,j=-m}^{m}(\omega_{ij}\hat{a}_{ij}^\beta) - \sum_{i,j=-m}^{m} i(\omega_{ij}\hat{b}_{ij}^\beta) - \sum_{i,j=-m}^{m} j(\omega_{ij}\hat{c}_{ij}^\beta)}{1 + \sum_{i,j=-m}^{m} \omega_{ij}}$$

The equation (36) is in fact the same as equation (26) except the index $\beta$ for the band. Hence the pipeline calculations for equation (26) are performed to obtain the noise suppressed pixel value for each band $\beta$.

FIG. 14 is a diagram illustrating the RGB image pipeline processing 6B in FIG. 13 in flow chart form. Each color band is padded in block 18B according to the padding method of a single band as shown in block 18 in FIG. 8. The RGB image pipeline initialization 26B and the RGB line pipeline initialization 24B is performed in the same manner as the image pipeline initialization 26 in FIG. 8 and the line pipeline initialization 24 in FIG. 8 except that the goodness of the fit is now calculated according to equation (34) to combine all the bands. Then the RGB line pipeline processing 10B whose details are shown in FIG. 15 are performed for all the valid pixels in the image resulting the noise reduced $\overline{RGB}$ image.

Figure 15:
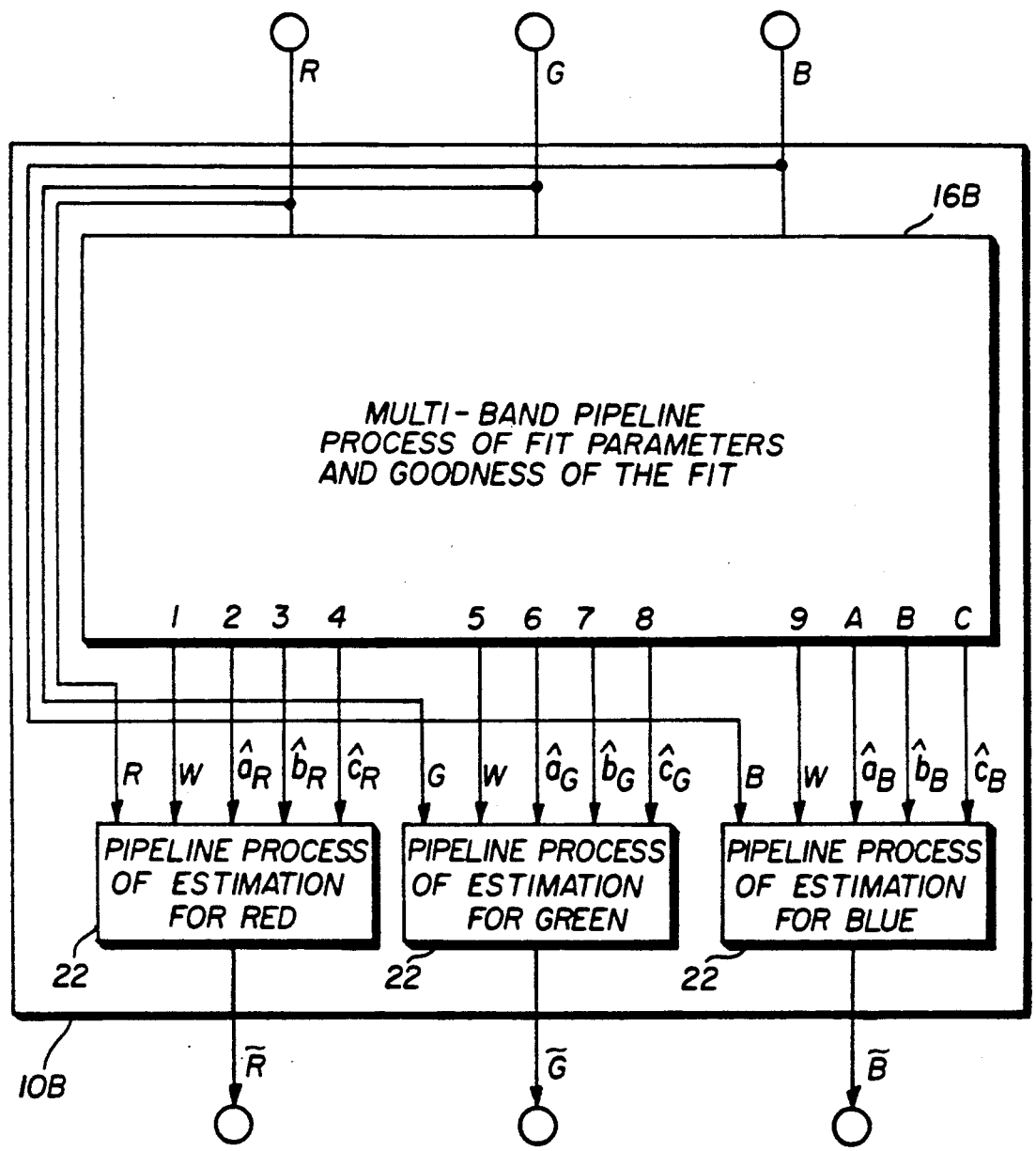
FIG. 15 is a block diagram illustrating the RGB line pipeline processing in FIG. 14 to process multi-band images with a single neighborhood size.

FIG. 15 is a diagram illustrating the RGB line pipeline processing 10B for processing a multiband image with a single neighborhood size. The multiband pipeline process of the fit parameters and the goodness of the fit are performed in block 16B which is shown in detail in FIG. 16. The output of the block 16B consists of the fit parameters for each band and the combined weighting factor for the fit. The pipeline process of estimation for each band which is the same as the pipeline process block 22 depicted in FIG. 9 is performed to each color band resulting in the noise suppressed image.

Figure 16:
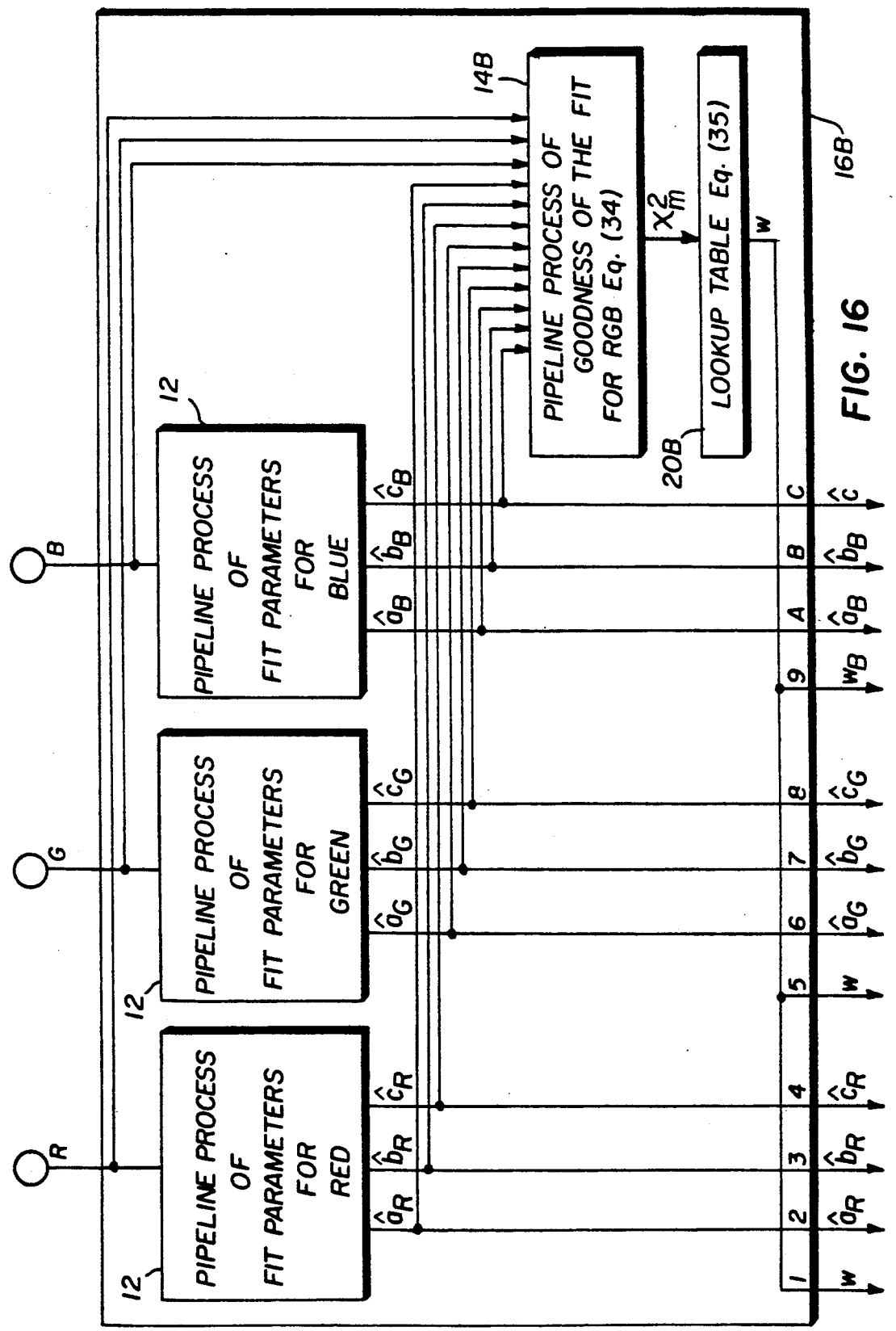
FIG. 16 is a block diagram illustrating the details of the pipeline process for fit parameters and goodness of the fit in FIG. 15.

FIG. 16 is a diagram illustrating the details of the multi-band pipeline process for the fit parameters and goodness of the fit 16B for processing a multi-band image. It is the generalization of the pipeline process of fit parameters and goodness of the fit 16 in FIG. 9 for processing a multi-band image. The fit parameters for each color band is calculated in block 12 in FIG. 9. The goodness of the fit for each band are combined together in block 14B to yield the combined goodness of the fit according to equation (34). The weight of the fit is derived from a lookup table 20B according to equation (35).

Processing a Multi-Band Image Employing Multiple Neighborhood Sizes

Figure 17:
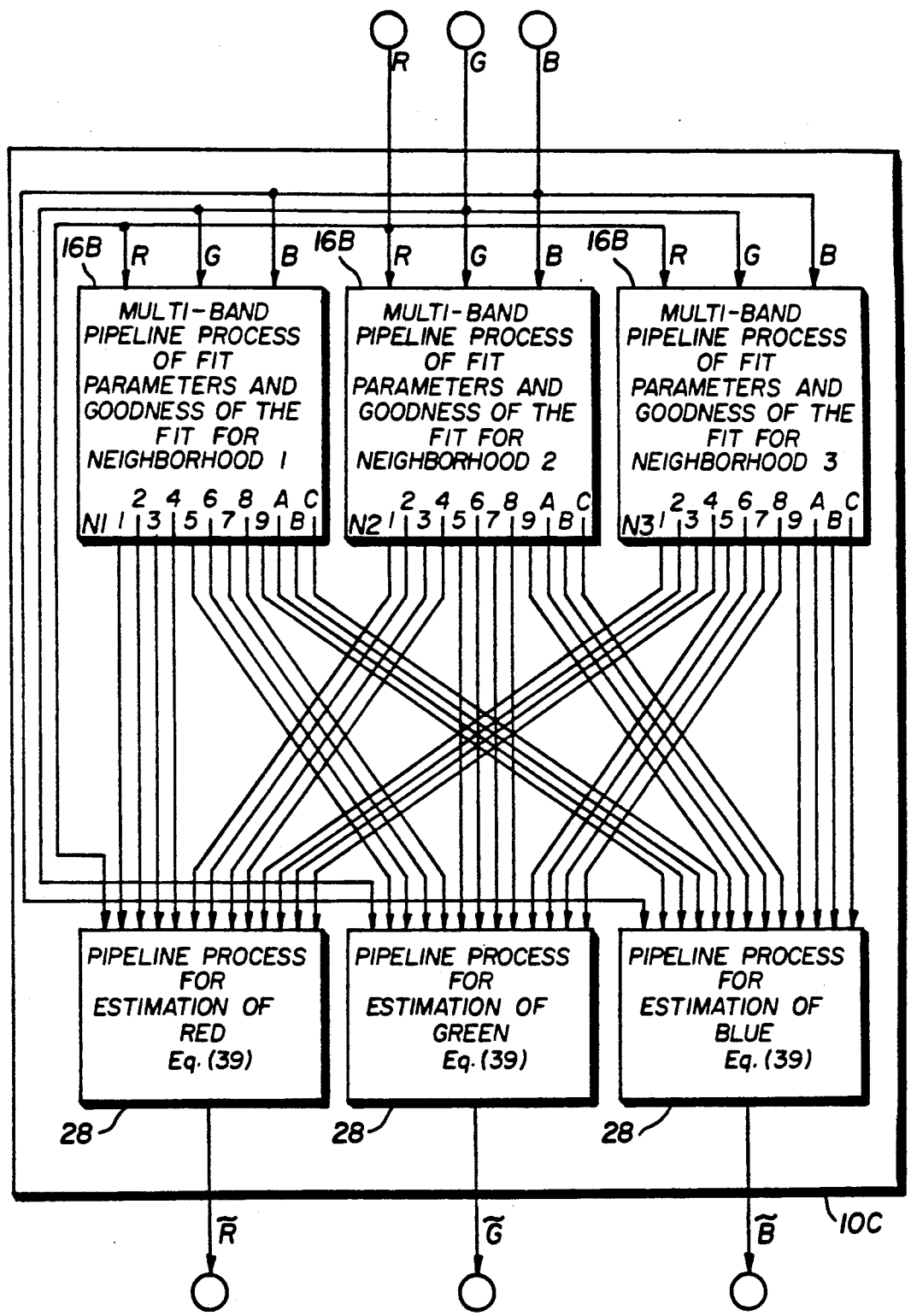
FIG. 17 is a block diagram illustrating the details of the RGB line pipeline processing in FIG. 14 to process multi-band images with multiple neighborhoods.

Finally, the pipeline calculation method is extended to processing a multi-band image employing the multiple neighborhood sizes. FIG. 17 is a block diagram of the RGB line pipeline processing 10C illustrating a method of processing multi-band images when block 10B is replaced by block 10C in FIG. 14. For each neighborhood type $\alpha$, the fit parameters $a^{\hat{\alpha}\beta}, b^{\hat{\alpha}\beta}, c^{\hat{\alpha}\beta}$ and the combined goodness of the fit for all the bands $$\chi_{\alpha m}^2 = \frac{1}{k} \sum_{\beta=1}^{k} \chi_{\alpha\beta}^2 \qquad (37)$$

are calculated in blocks 16B. For each neighborhood type $\alpha$, the lookup table for the weight of the fit $\omega^\alpha$ is constructed in blocks 16B according to:

$$\omega^\alpha = f\alpha e^{-p\alpha x^2 \alpha m} \qquad (38)$$

where $\alpha$ is an index for the neighborhood type, $p_\alpha$ are free parameters, typically value of 1, and $\chi_{\alpha m}^2$ is the multi-band combined goodness of the fit for the neighborhood type $\alpha$. The results of calculations for all the neighborhood types are then combined bandwise in blocks 28 to yield the final pixel value as follows:

$$\bar{z}^\beta = \frac{z^\beta + \sum_{\alpha=1}^{l}\sum_{i,j=-m}^{m}(\omega_{ij}^\alpha \hat{a}_{ij}^{\alpha\beta}) - \sum_{\alpha=1}^{l}\sum_{i,j=-m}^{m} i(\omega_{ij}^\alpha \hat{b}_{ij}^{\alpha\beta}) - \sum_{\alpha=1}^{l}\sum_{i,j=-m}^{m} j(\omega_{ij}^\alpha \hat{c}_{ij}^{\alpha\beta})}{1 + \sum_{\alpha=1}^{l}\sum_{i,j=-m}^{m} \omega_{ij}^\alpha} \qquad (39)$$

where $\beta$ is an index for the band, $\alpha$ is an index for the neighborhood size, l is the number of neighborhood sizes (typically 3). Equation (39) is essentially the same as the equation (31) except the index for the band $\beta$.

Figure 18:
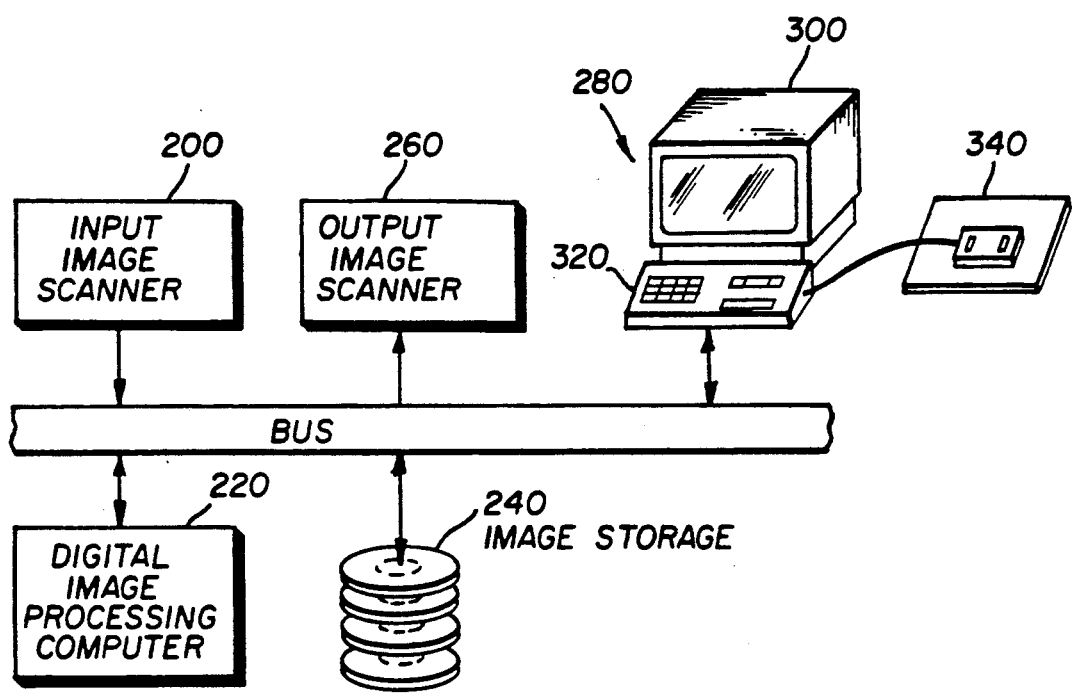
FIG. 18 illustrates a system for implementing the present invention.

FIG. 18 is a schematic diagram showing a digital image processing facility useful for practicing the present invention. The digital image processing facility includes an input image scanner 200, such as a CCD scanner, a graphic arts flat bed scanner, or a drum scanner. A digital image signal generated by the input scanner 200 is processed by a digital image processing computer 220. The digital image processing computer 220 can be a general purpose computer, or a special purpose computer specifically designed for processing images. The original digital image from the scanner 200 may be stored in a mass image storage memory 240. The original and/or processed image may be displayed by means of the output image scanner 260, such as a CRT or a laser film scanner. The system is controlled by an operator from a workstation 280. The workstation includes a CRT 300 for temporarily displaying an image, a keyboard 320, and a graphics input device, such as a mouse and a graphics tablet 340.

Processing an Image With Higher Order Surface Fit

Overlapping planes may not be a satisfactory representation of an image. Then fitting local surfaces with higher order polynomials may improve the approximation. The necessary equations to carry out the pipeline calculations are summarized in Appendix A and B in case of second and third order polynomial fit respectively. The extension of this method to a higher order polynomial fit is straightforward in view of applicants' teaching.

While there has been shown what is considered to be the preferred embodiment of the invention, it will be manifest that many changes and modifications may be made therein without departing from the essential spirit of the invention. It is intended, therefore, in the annexed claims, to cover all such changes and modifications that may fall within the true scope of the invention.

Appendix A

Sliding sum calculation for the second order surface fit

For second order surface fit, it is necessary to evaluate the following summations.

$$\sum_{i=-m}^{m}\sum_{j=-m}^{m} z_{ij}, \sum_{i=-m}^{m}\sum_{j=-m}^{m} iz_{ij}, \sum_{i=-m}^{m}\sum_{j=-m}^{m} jz_{ij},$$

$$\sum_{i=-m}^{m}\sum_{j=-m}^{m} i^2 z_{ij}, \sum_{i=-m}^{m}\sum_{j=-m}^{m} ijz_{ij}, \sum_{i=-m}^{m}\sum_{j=-m}^{m} j^2 z_{ij}$$

The sliding sum of the first three are the same as in the first order polynomial fit. To calculate the sums in the second group, define $$D_2(x,y) = \sum_{i=-m}^{m}\sum_{j=-m}^{m} i^2 z_{ij} \tag{37}$$

$$E_2(x,y) = \sum_{i=-m}^{m}\sum_{j=-m}^{m} ij z_{ij} \tag{38}$$

$$F_2(x,y) = \sum_{i=-m}^{m}\sum_{j=-m}^{m} j^2 z_{ij} \tag{39}$$

and $$F_1(x,y) = \sum_{j=-m}^{m} j^2 z_{ij} \tag{40}$$

The following recurrence relations hold, which enable the sliding sum.

$$D_2(x,y) = D_2(x-1,y) + m^2\{A_1(x+m,y) - \tag{41}$$
$$A_1(x-m-1,y)\} - 2\{B_2(x-1,y) + mA_1(x-m-1,y)\} +$$
$$\{A_2(x-1,y) - A_1(x-m-1,y)\}$$

$$E_2(x,y) = E_2(x-1,y) + m\{C_1(x+m,y) + \tag{42}$$
$$C_1(x-m-1,y)\} - \{C_2(x-1,y) - C_1(x-m-1,y)\}$$

$$F_1(x,y) = F_1(x,y-1) + m^2\{z(x,y+m) - \tag{43}$$
$$z(x,y-m-1)\} - 2\{C_1(x,y-1) + mz(x,y-m-1)\} +$$
$$\{A_1(x,y-1) - z(x,y-m-1)\}$$

$$F_2(x,y) = F_2(x-1,y) + F_1(x+m,y) - F_1(x-m-1,y) \tag{44}$$

The definitions of $A_1$, $A_2$, $B_2$, $C_1$, and $C_2$ are the same as in the text.

Appendix B

Summation calculation for the third order polynomial fit

The additional calculation needed to be performed for 3rd order polynomial fit is to calculate the followings.

$$G_2(x,y) = \sum_{i=-m}^{m}\sum_{j=-m}^{m} i^3 z_{ij} \tag{45}$$

$$H_2(x,y) = \sum_{i=-m}^{m}\sum_{j=-m}^{m} i^2 j z_{ij} \tag{46}$$

$$I_2(x,y) = \sum_{i=-m}^{m}\sum_{j=-m}^{m} ij^2 z_{ij} \tag{47}$$

$$J_2(x,y) = \sum_{i=-m}^{m}\sum_{j=-m}^{m} j^3 z_{ij} \tag{48}$$

$$J_1(x,y) = \sum_{j=-m}^{m} j^3 z_{ij} \tag{49}$$

$$G_2(x,y) = G_2(x-1,y) + m^3\{A_1(x+m,y) + \tag{50}$$
$$A_1(x-m-1,y)\} - 3\{D_2(x-1,y) -$$
$$m^2 A_1(x-m-1,y)\} + 3\{B_2(x-1,y) +$$
$$mA_1(x-m-1,y)\} - \{A_2(x-1,y) - A_1(x-m-1,y)\}$$

$$H_2(x,y) = H_2(x-1,y) + m^2\{C_1(x+m,y) - \tag{51}$$
$$C_1(x-m-1,y)\} - 2\{E_2(x-1,y) + mC_1(x-m-1,y)\} +$$
$$\{C_2(x-1,y) - C_1(x-m-1,y)\}$$

$$I_2(x,y) = I_2(x-1,y) + m\{F_1(x+m,y) + \tag{52}$$
$$F_1(x-m-1,y)\} - \{F_2(x-1,y) - F_1(x-m-1,y)\}$$

$$J_1(x,y) = J_1(x,y-1) + m^3\{z(x,y+m) + \tag{53}$$
$$z(x,y-m-1)\} - 3\{F_1(x,y-1) - m^2 z(x,y-m-1)\} +$$
$$3\{C_1(x,y-1) + mz(x,y-m-1)\} -$$
$$\{A_1(x,y-1) - z(x,y-m-1)\}$$

$$J_2(x,y) = J_2(x-1,y) + J_1(x+m,y) - J_1(x-m-1,y) \tag{54}$$

The extension of this method to the higher order fit is trivial.

We claim:

1. A method for efficiently reducing digital image noise in single-band digital images comprising the steps of:
   a. transforming, by a homoscedastic transform, an original image into a single-band digital image formed of a matrix of pixel elements, each having an identical noise variance value;
   b. selecting several square neighborhood sizes;
   c. selecting a target pixel from the matrix of pixel elements;
   d. selecting one of said neighborhood sizes (of step b);
   e. selecting a neighborhood of said size, containing said target pixel;
   f. fitting a plane to the pixels in the selected neighborhood by performing a linear least squares regression by, determining the average value of the pixels in the selected neighborhood and determining the slope of the fitted plane in two directions;
   g. determining the goodness of fit for the fitted plane, and determining the weight from the goodness of fit for said neighborhood;

h. iterating steps e through g for every neighborhood of a said size containing said target pixel;
i. iterating d through h for every neighborhood size;
j. combining, with said weights, the value of the fitted plane at the target pixel, for each neighborhood from steps h and i, with the original target pixel value to provide an estimated value of the target pixel;
k. iterating steps c through j for all pixels of the matrix of pixel elements; and
l. transforming the estimated value (from step j) by the inverse of the homoscedastic transformation, to yield a set of reduced noise image pixels.

2. A method for efficiently reducing digital image noise in multi-band digital images comprising the steps of:
 a. transforming, by a homoscedastic transform applied to each band, an original image into a multi-band digital image wherein each band is formed of a matrix of pixel elements, such that within each band each pixel element has an identical noise variance value;
 b. selecting several square neighborhood sizes;
 c. selecting a target pixel from the matrix of pixel elements;
 d. selecting one of said neighborhood sizes (of step b);
 e. selecting a neighborhood of said size, containing said target pixel;
 f. selecting a band from the multi-band image;
 g. fitting a plane to the pixels in the selected neighborhood by performing a linear least squares regression by, determining the average value of the pixels in the selected neighborhood and determining the slope of the fitted plane in two directions;
 h. iterating steps f and g for each band;
 i. determining the goodness of fit for the fitted planes, and determining the weight from the goodness of fit for said neighborhood;
 j. iterating steps e through i for every neighborhood of a said size containing said target pixel;
 k. iterating steps d through j for every neighborhood size;
 l. selecting a band from the multi-band image;
 m. combining, with said weights, the value of the fitted plane at the target pixel, for each neighborhood from steps j and k, with the original target pixel value to provide an estimated value of the target pixel;
 n. iterating steps l and m for each band;
 o. iterating steps c through m for all pixels; and
 p. transforming the estimated value (from step m) by the inverse of the homoscedastic transformation applied to each band, to yield a set of reduced noise image pixels.

3. A method for efficiently reducing digital image noise in single-band digital images comprising the steps of:
 a. transforming, by a homoscedastic transform, an original image into a single-band digital image formed of a matrix of pixel elements, each having an identical noise variance value;
 b. selecting several square neighborhood sizes;
 c. selecting a target pixel from the matrix of pixel elements;
 d. selecting one of said neighborhood sizes (of step b);
 e. selecting a neighborhood of said size, containing said target pixel;
 f. fitting a plane to the pixels in the selected neighborhood by performing a linear least squares regression by, determining the average value of the pixels in the selected neighborhood and determining the slope of the fitted plane in two directions, wherein computations are performed by a sliding sum technique;
 g. determining the goodness of fit for the fitted plane, wherein computations are performed by a sliding sum technique, and determining the weight from the goodness of fit for said neighborhood;
 h. iterating steps e through g for every neighborhood of a said size containing said target pixel;
 i. iterating steps d through h for every neighborhood size;
 j. combining, with said weights, the value of the fitted plane at the target pixel, for each neighborhood from steps h and i, with the original target pixel value to provide an estimated value of the target pixel, wherein computations are performed by a sliding sum technique;
 k. iterating steps c through j for all pixels of each matrix of pixel elements; and
 l. transforming the estimated value (from step j) by the inverse of the homoscedastic transformation, to yield a set of reduced noise image pixels.

4. A method for efficiently reducing digital image noise in a single-band digital image formed of a matrix of rows and columns of pixel elements with each of said pixels having an identical noise variance value and wherein pipeline calculations are performed by a sliding sum technique comprising the steps of:
 a. selecting one or more square neighborhood sizes;
 b. generating a lookup table for each neighborhood size for inputting the value of the goodness of fit and for outputting a corresponding weight;
 c. selecting a first row of said matrix of pixel elements which completely contains the largest neighborhood among said neighborhood sizes and initializing the pipeline calculations of said matrix for all neighborhood sizes;
 d. selecting a target pixel at the first column of said selected row which completely contains the largest neighborhood among said neighborhood sizes and initializing the pipeline calculations of the selected row for all neighborhood sizes;
 e. selecting one of said neighborhood sizes (of step a);
 f. performing pipeline calculations to determine fit parameters of a plane to a neighborhood of pixels centered at said target pixel;
 g. performing a pipeline calculation to obtain the goodness of fit;
 h. determining the weight from said lookup table for said neighborhood;
 i. iterating the steps e through h for every neighborhood size;
 j. performing pipeline calculations of estimating the final pixel value by combining, with said weights, the values of all the fitted planes of the neighborhoods containing said target pixel with the original pixel value;
 k. iterating steps e through j sequentially for all the subsequent pixels in the selected row; and
 l. iterating steps d through k sequentially for all rows of said matrix.

5. The method according to claim 4 or claim 6 or claim 7 or claim 8 for efficiently reducing digital image noise in a single-band digital image formed of a matrix of rows and columns of pixel elements and further comprising steps of:
  i. forming an enlarged padded image from the original image by filling in pixels along rows and columns; and
  ii. processing said padded image according to steps a through l.

6. A method of processing a single band digital image formed of a matrix of pixels with non-identical noise variance value comprising the steps of:
  A. transforming, by a homoscedastic transform, an original image into a single-band digital image with pixels having an identical noise variance value;
  B. processing said transformed image by
     a. selecting one or more square neighborhood sizes;
     b. generating a lookup table for each neighborhood size for inputting the value of the goodness of fit and for outputting a corresponding weight;
     c. selecting a first row of said matrix of pixel elements which completely contains the largest neighborhood among said neighborhood sizes and initializing the pipeline calculations of said matrix for all neighborhood sizes;
     d. selecting a target pixel at the first column of said selected row which completely contains the largest neighborhood among said neighborhood sizes and initializing the pipeline calculations of the selected row for all neighborhood sizes;
     e. selecting one of said neighborhood sizes (of step a);
     f. performing pipeline calculations to determine fit parameters of a plane to a neighborhood of pixels centered at said target pixel;
     g. performing a pipeline calculation to obtain the goodness of fit;
     h. determining the weight from said lookup table for said neighborhood;
     i. iterating the steps e through h for every neighborhood size;
     j. performing pipeline calculations of estimating the final pixel value by combining, with said weights, the values of all the fitted planes of the neighborhoods containing said target pixel with the original pixel value;
     k. iterating steps e through j sequentially for all the subsequent pixels in the selected row;
     l. iterating steps d through k sequentially for all rows of said matrix; and
  C. transforming the processed image by the inverse of the homoscedastic transformation to yield a noise suppressed image.

7. A method of processing a digital color image comprising the steps of:
  A. forming red, green, and blue pixel values representing the original digital color image;
  B. transform the red, green, and blue pixel values by a matrix to obtain luminance and chrominance band values;
  C. processing said luminance band by
     a. selecting one or more square neighborhood sizes;
     b. generating a lookup table for each neighborhood size for inputting the value of the goodness of fit and for outputting a corresponding weight;
     c. selecting a first row of said matrix of pixel elements which completely contains the largest neighborhood among said neighborhood sizes and initializing the pipeline calculations of said matrix for all neighborhood sizes;
     d. selecting a target pixel at the first column of said selected row which completely contains the largest neighborhood among said neighborhood sizes and initializing the pipeline calculations of the selected row for all neighborhood sizes;
     e. selecting one of said neighborhood sizes (of step a);
     f. performing pipeline calculations to determine fit parameters of a plane to a neighborhood of pixels centered at said target pixel;
     g. performing a pipeline calculation to obtain the goodness of fit;
     h. determining the weight from said lookup table for said neighborhood;
     i. iterating the steps e through h for every neighborhood size;
     j. performing pipeline calculations of estimating the final pixel value by combining, with said weights, the values of all the fitted planes of the neighborhoods containing said target pixel with the original pixel value;
     k. Iterating steps e through j sequentially for all the subsequent pixels in the selected row; and
     l. iterating steps d through k sequentially for all rows of said matrix; and
  D. combining the processed luminance values with the chrominance band values by the inverse of the matrix to yield a noise suppressed color image.

8. A method of processing a digital color image comprising the steps of:
  A. forming red, green, and blue pixel values representing the original digital color image;
  B. transforming the red, green, and blue pixel values by a matrix to obtain luminance and chrominance band values;
  C. transforming, by a homoscedastic transform, the luminance band image, formed of said luminance band values, into a transformed luminance band image with pixels having an identical noise variance value;
  D. processing said transformed luminance band image by
     a. selecting one or more square neighborhood sizes;
     b. generating a lookup table for each neighborhood size for inputting the value of the goodness of fit and for outputting a corresponding weight;
     c. selecting a first row of said matrix of pixel elements which completely contains the largest neighborhood among said neighborhood sizes and initializing the pipeline calculations of said matrix for all neighborhood sizes;
     d. selecting a target pixel at the first column of said selected row which completely contains the largest neighborhood among said neighborhood sizes and initializing the pipeline calculations of the selected row for al neighborhood sizes;
     e. selecting one of said neighborhood sizes (of step a);
     f. performing pipeline calculations to determine fit parameters of a plane to a neighborhood of pixels centered at said target pixel;
     g. performing a pipeline calculation to obtain the goodness of fit;
     h. determining the weight from said lookup table for said neighborhood;
     i. iterating the steps e through h for every neighborhood size;

j. performing pipeline calculations of estimating the final pixel value by combining, with said weights, the values of all the fitted planes of the neighborhoods containing said target pixel with the original pixel value;

k. iterating steps e through j sequentially for all the subsequent pixels in the selected row;

l. iterating steps d through k sequentially for all rows of said matrix.

E. transforming said processed luminance band image by the inverse of the homoscedastic transformation to yield a noise suppressed luminance band image; and F. combining said noise suppressed luminance band value with said chrominance band values by the inverse of said matrix to yield a noise suppressed color image.

9. A method for efficiently reducing digital image noise in multi-band digital images wherein each band is a matrix of rows and columns of pixel elements such that within each band each pixel element has an identical noise variance value, and wherein pipeline calculations are performed by a sliding sum technique comprising the steps of:

a. selecting one or more square neighborhood sizes;

b. forming a lookup table for each neighborhood size for inputting the value of the goodness of fit and for outputting a corresponding weight;

c. selecting a first row of said matrix of pixel elements which completely contains the largest neighborhood among said neighborhood sizes and initializing the pipeline calculations of the image for all neighborhood sizes and for all bands;

d. selecting a target pixel at the first column of said selected row which completely contains the largest neighborhood among said neighborhood sizes and initializing the pipeline calculations of the selected row for all neighborhood sizes and for all bands;

e. selecting one of said neighborhood sizes (of step a);

f. selecting a band from the multi-band image;

g. performing pipeline calculations to determine fit parameters of a plane to a neighborhood of pixels centered at said target pixel;

h. iterating steps f and g for each band;

i. performing a pipeline calculation to obtain the goodness of fit;

j. determining the weight from said lookup table for said neighborhood;

k. iterating steps e through j for every neighborhood size;

l. selecting a band from the multi-band image;

m. performing pipeline calculations of estimating the final pixel value by combining, with said weights, the values of all the fitted planes of the neighborhoods containing said target pixel with the original pixel value;

n. iterating steps l and m for each band;

o. iterating steps e through n sequentially for all the subsequent pixels in the selected row;

p. iterating steps d through o sequentially for all rows in said matrix.

10. The method for efficiently reducing digital image noise in multi-band digital images according to claim 9 or claim 11 and further comprising the steps of:

i. forming an enlarged padded image from the original image by filling in pixels along rows and columns for each band; and ii. processing said padded image according to steps a-p.

11. A method for efficiently reducing digital image noise in multi-band digital images wherein each band is a matrix of rows and columns of pixel elements and wherein pipeline calculations are performed by a sliding sum technique comprising the steps of:

A. transforming, by a homoscedastic transform applied to each band, an original image into a multi-band digital image wherein each band is formed of a matrix of pixel elements, such that within each band each pixel element has an identical noise variance value;

B. processing said transformed image by a. selecting one or more square neighborhood sizes;

b. forming a lookup table for each neighborhood size for inputting the value of the goodness of fit and for outputting a corresponding weight;

c. selecting a first row of said matrix of pixel elements which completely contains the largest neighborhood among said neighborhood sizes and initializing the pipeline calculations of the image for all neighborhood sizes and for all bands;

d. selecting a target pixel at the first column of said selected row which completely contains the largest neighborhood among said neighborhood sizes and initializing the pipeline calculations of the selected row for all neighborhood sizes and for all bands;

e. selecting one of said neighborhood sizes (of step a);

f. selecting a band from the multi-band image;

g. performing pipeline calculations to determine fit parameters of a plane to a neighborhood of pixels centered at said target pixel;

h. iterating steps f and g for each band;

i. performing a pipeline calculation to obtain the goodness of fit;

j. determining the weight from said lookup table for said neighborhood;

k. iterating steps e through j for every neighborhood size;

l. selecting a band from the multi-band image;

m. performing pipeline calculations of estimating the final pixel value by combining, with said weights, the values of all the fitted planes of the neighborhoods containing said target pixel with the original pixel value;

n. iterating steps l and m for each band;

o. iterating steps e through n sequentially for all the subsequent pixels in the selected row;

p. iterating steps d through o sequentially for all rows in said matrix;

C. transforming the processed image by the inverse of the homoscedastic transformation applied to each band to yield a noise suppressed image.

12. The method as in any of claims 1-5 or 9-10 wherein neighborhoods are chosen other than square neighborhoods.

13. The method as in any of claims 1-5 or 9-10 wherein the processing is performed column-wise instead of row-wise by interchanging role of the rows and the columns.

14. The method as in any of claims 1-5 or 9-10 wherein a high order polynomial surface fit is applied to the selected neighborhoods.

15. A system for efficiently reducing digital image noise in single-band digital images comprising:

first transforming means for transforming, by a homoscedastic transform, an original image into a single-band digital image formed of a matrix of pixel elements, each having an identical noise variance value;

processing means for pipeline processing each of the pixel elements of said formed matrix as a target pixel by fitting a plane to the pixels in selected neighborhoods around a target pixel and determining a goodness of fit value for the fitted plane for every target pixel and for every neighborhood size, and also for determining a weighting value and for calculating an estimated value of each pixel in the matrix of pixel elements utilizing the determined values and the original pixel values;

second transforming means for transforming the estimated target pixel values by the inverse of the homoscedastic transformation of said first transforming means, to yield a set of reduced noise image pixels; and means for forming an image from said set of reduced noise image pixels.

16. The system according to claim 15 wherein said processing means is comprised of:

means for receiving the matrix of pixel values representing an original image;

means for fitting a plane to neighborhood around a pixel designated a target pixel to determine fit parameters;

means receiving said fit parameters for providing a goodness of fit value;

look-up table means for receiving the provided goodness of fit value and for providing a determining weighting factor; and estimation means for receiving the value of the original image, said determined weighting factor, and the determined fit parameters for providing said estimated pixel value.

17. A system for efficiently reducing digital image noise in a single-band digital image formed of a matrix of rows and columns of pixel elements with each of said pixels having an identical noise variance value and wherein pipeline calculations are performed by a sliding sum technique comprising:

means for receiving the matrix of pixel values representing an original image;

a plurality of look-up tables, corresponding in number to the number of neighborhood sizes selected for the sliding sum technique, each table having an input for receiving a goodness of fit value and an output for providing a corresponding weight value;

means for selecting a first row of said matrix of said pixel elements which completely contains the largest neighborhood among the neighborhood sizes and initializing the pipeline calculations of said matrix for all neighborhood sizes;

means for selecting a target pixel at the first column of said selected row which completely contains the largest neighborhood among said neighborhood sizes and initializing the pipeline calculations of the selected row for all neighborhood sizes;

means for fitting a plane to a neighborhood around the target pixel to determine fit parameters;

means receiving said fit parameters for providing a goodness of fit value to said look-up tables; and estimation means for receiving the value of the original image, said determined weighting factor, and the determined fit parameters for providing said estimated pixel value; and means for forming an image from said estimated pixel values.

18. A system for efficiently reducing digital image noise in multi-band digital images comprising:

first transforming means for transforming, by a homoscedastic transform applied to each band, an original image into a multi-band digital image wherein each band is formed of a matrix of pixel elements, such that within a band each pixel element has an identical noise variance value;

a plurality of processing means one for each band of said multiple-band digital image for pipeline processing each of the pixel elements of said formed matrix as a target pixel by fitting a plane to the pixels in selected neighborhoods around a target pixel and for determining a goodness of fit value for the fitted plane for every target pixel and for every neighborhood size, and also for determining a weighting value;

estimation means for receiving the determined values from each of said processing means for calculating an estimated value of each pixel in the matrix of pixel elements utilizing the determined values and the original pixel values;

second transforming means for transforming the estimated target pixel values by the inverse of the homoscedastic transformation of said first transforming means to yield a set of reduced noise image pixels; and means for forming an image from said set of reduced noise image pixels.

19. The system according to claim 15 or 18 and further comprising:

means for forming an enlarged image from said formed matrix from said first transforming means by filling in pixels along rows and columns.

20. The system according to claim 17 and further comprising:

means for forming an enlarged image from said received matrix by filling in pixels along rows and columns.

* * * * *